July 7, 1953   M. S. CURTIS ET AL   2,644,222
MACHINE TOOL
Filed Aug. 22, 1947   18 Sheets-Sheet 1

INVENTORS
MYRON S. CURTIS
HARRY SCHOEPE
BY
Kwis, Hudson,
Boughton & Williams
ATTORNEYS July 7, 1953 M. S. CURTIS ET AL 2,644,222
MACHINE TOOL
Filed Aug. 22, 1947 18 Sheets-Sheet 2

INVENTORS
MYRON S. CURTIS
BY HARRY SCHOEPE
Kwis, Hudson, Boughton & Williams
ATTORNEYS

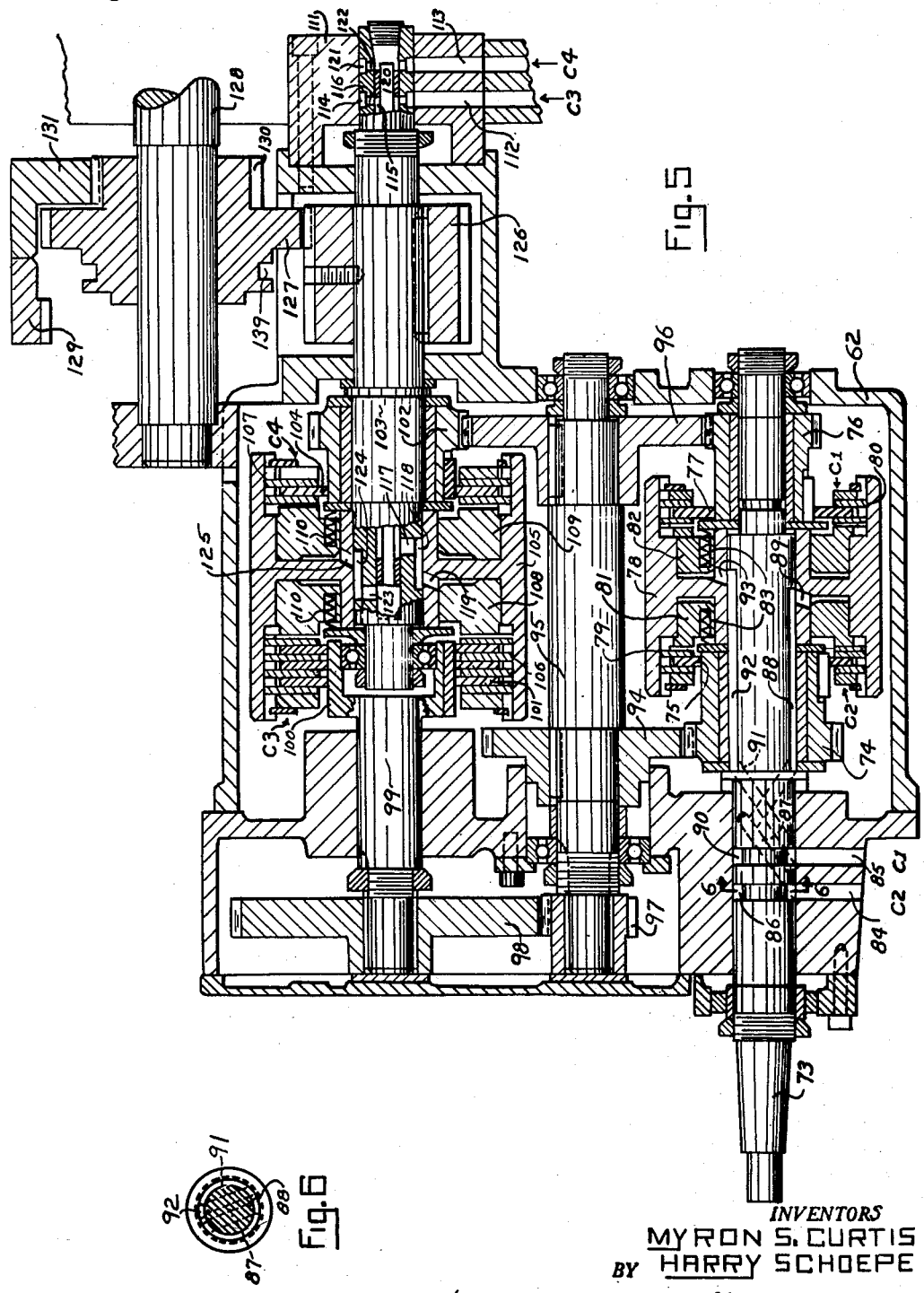

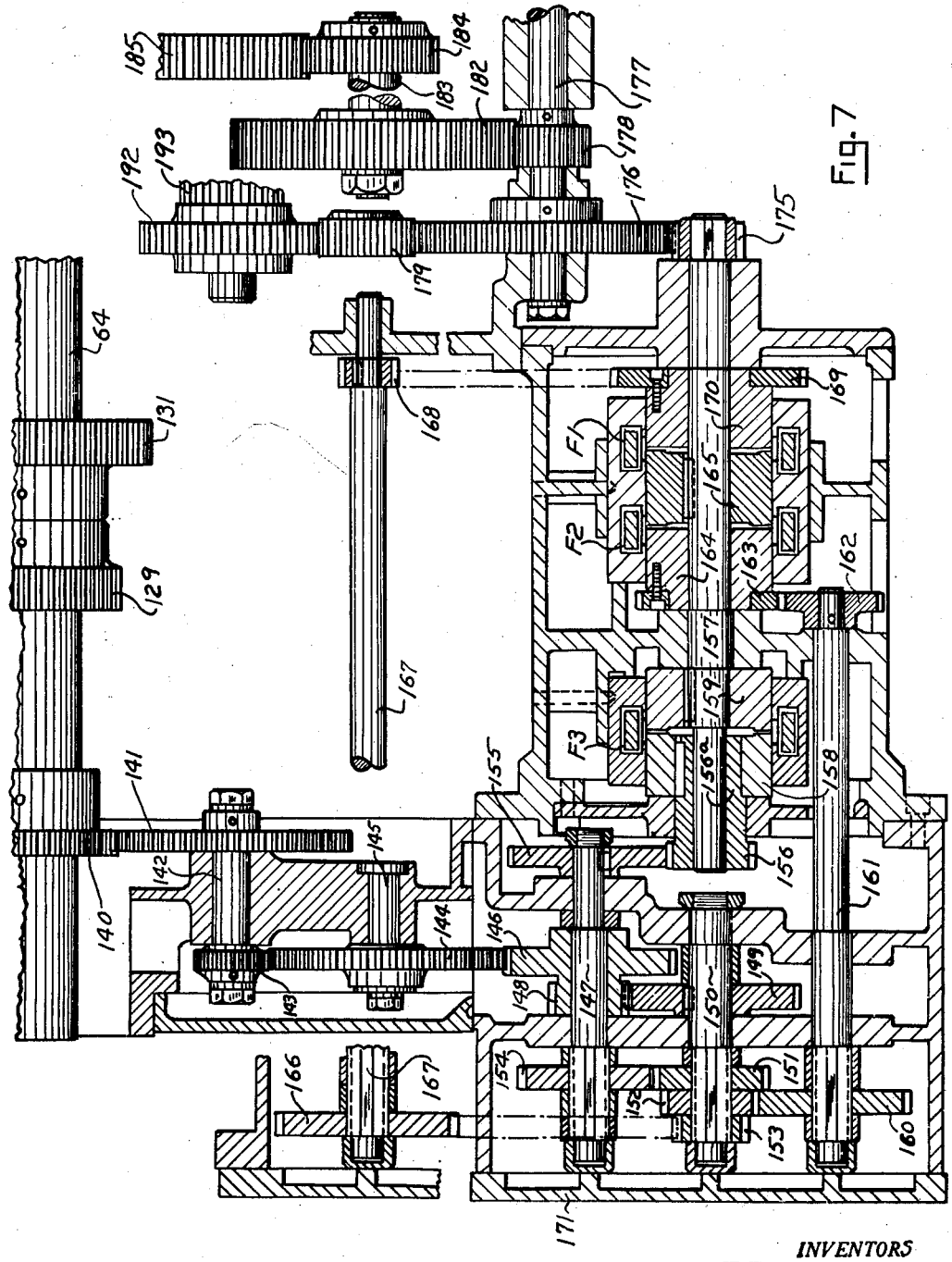

July 7, 1953  M. S. CURTIS ET AL  2,644,222
MACHINE TOOL
Filed Aug. 22, 1947  18 Sheets-Sheet 5
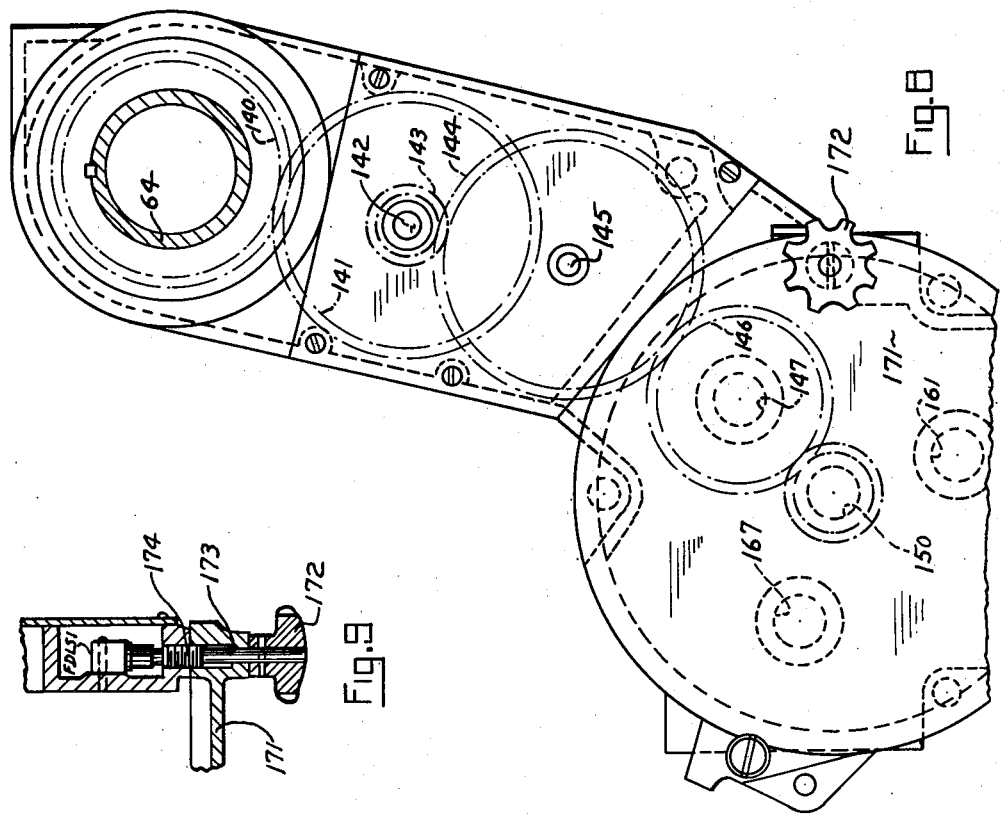
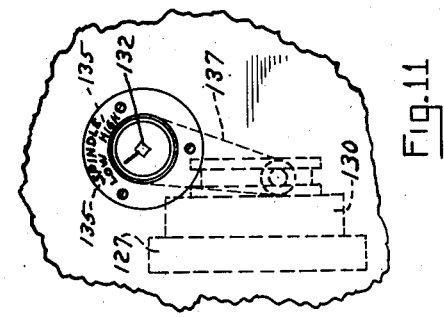
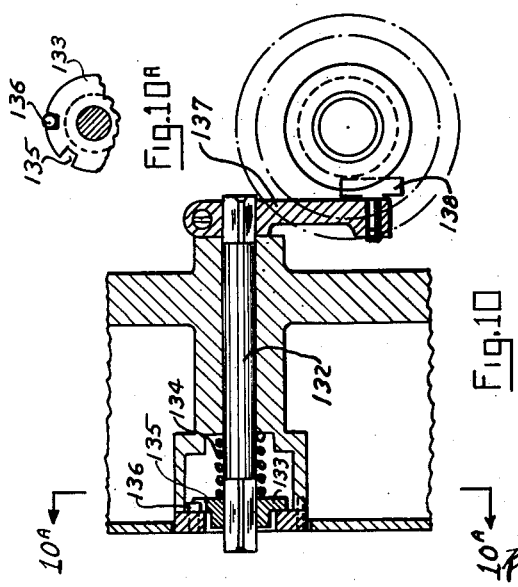
*INVENTORS*
MYRON S. CURTIS
BY HARRY SCHOEPE
*Kwis, Hudson, Boughton & Williams*
ATTORNEYS

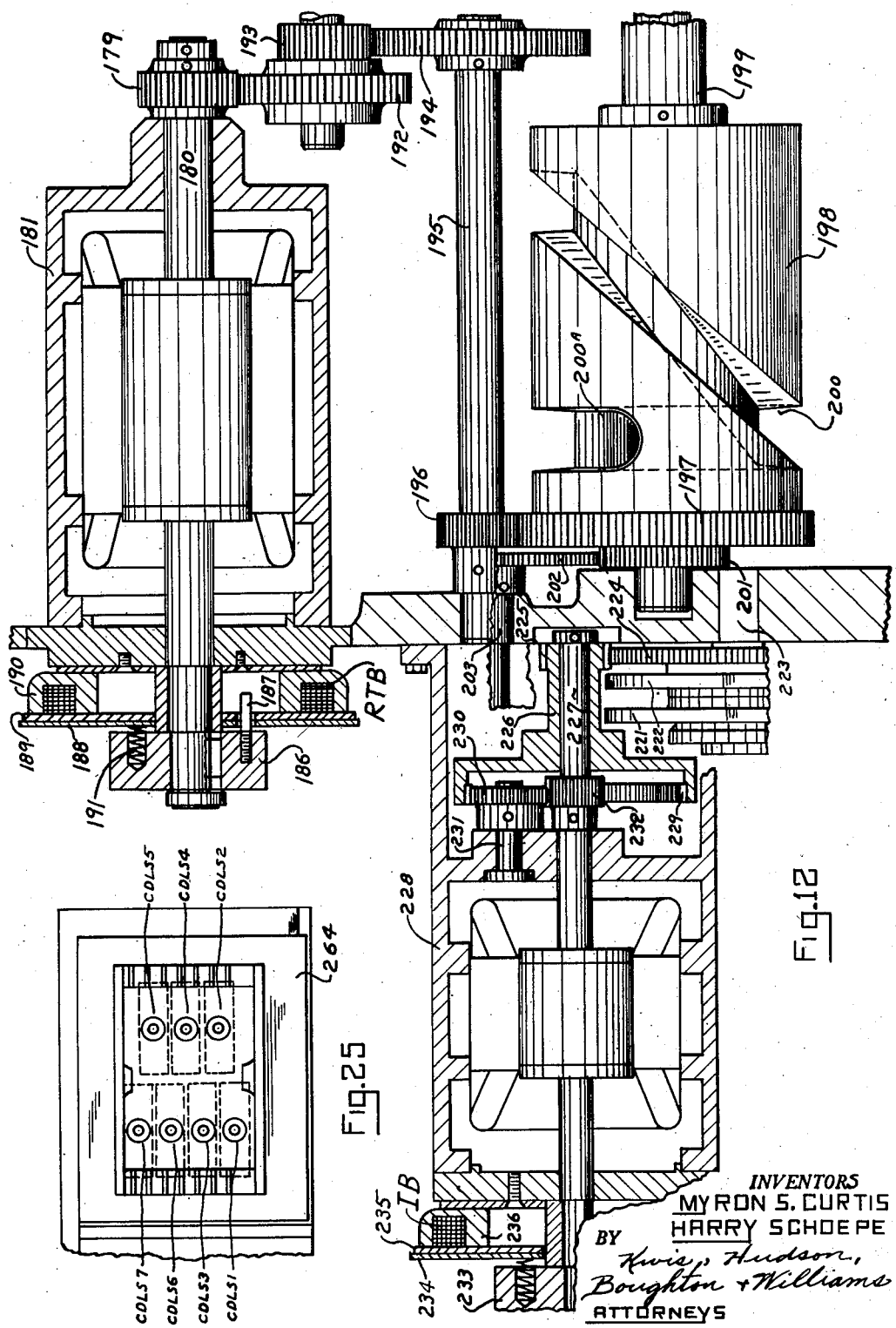

INVENTORS
MYRON S. CURTIS
HARRY SCHOEPE
BY Kurie, Hudson, Boughton & Williams
ATTORNEYS July 7, 1953 M. S. CURTIS ET AL 2,644,222
MACHINE TOOL
Filed Aug. 22, 1947 18 Sheets-Sheet 8
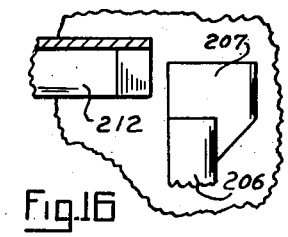
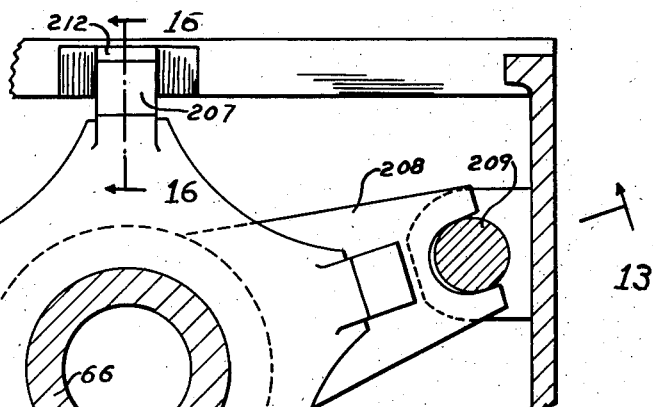
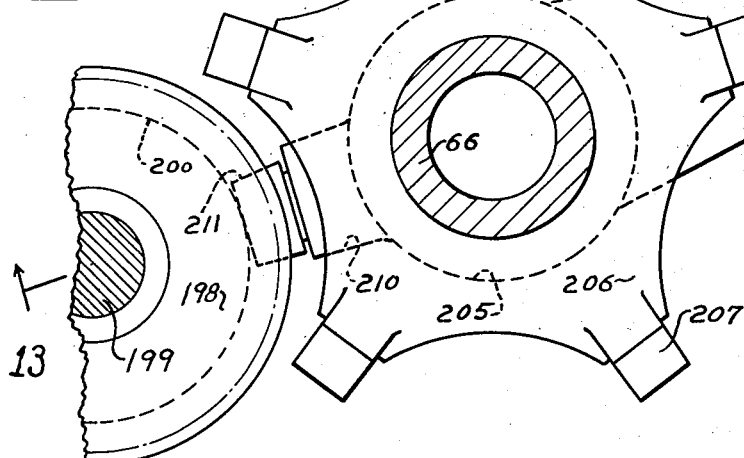
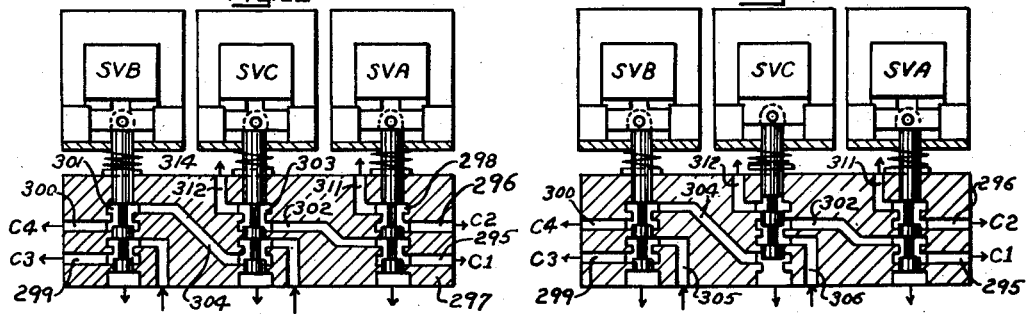
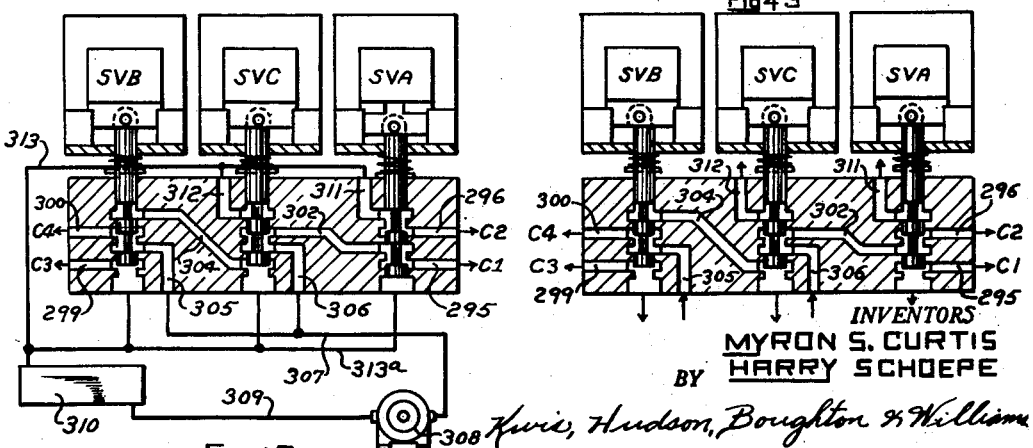
INVENTORS
MYRON S. CURTIS
BY HARRY SCHOEPE
Kwis, Hudson, Boughton & Williams
ATTORNEYS

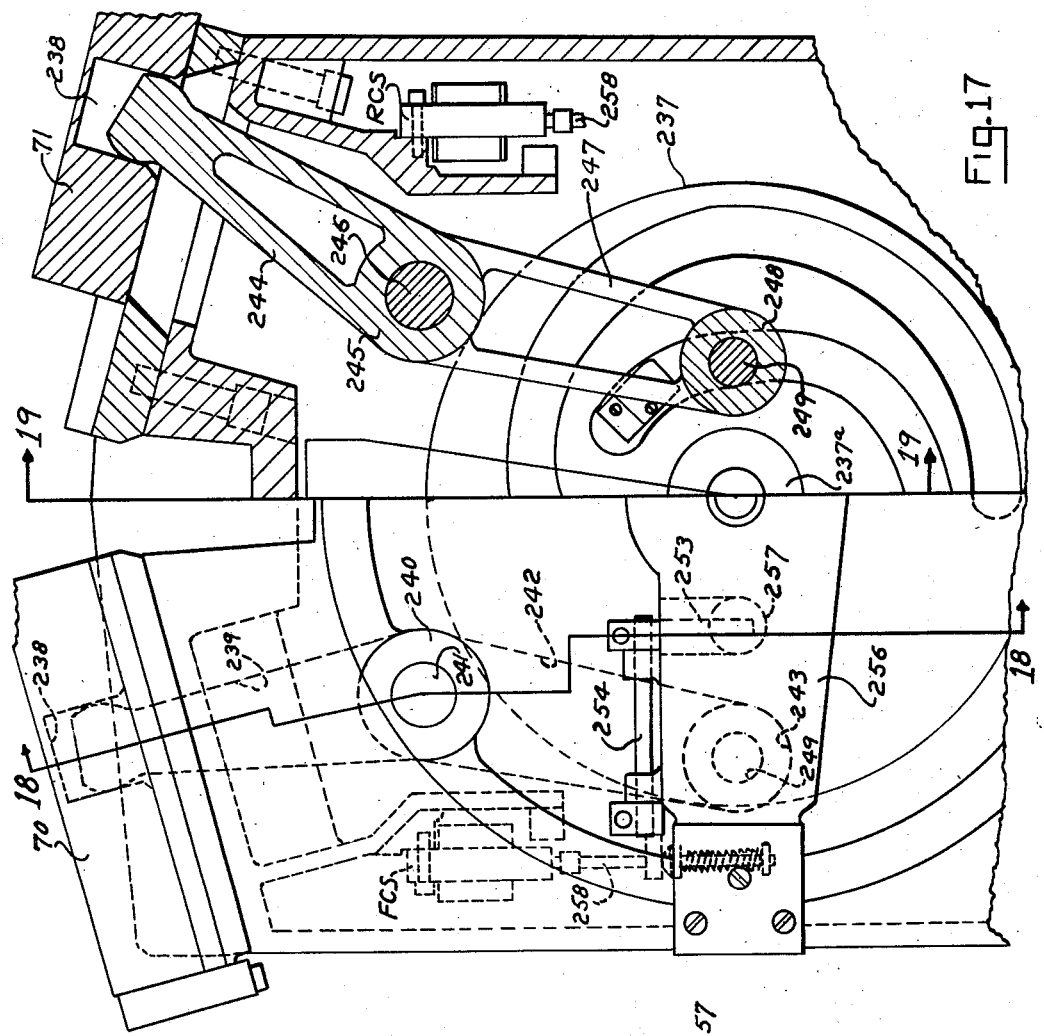

July 7, 1953 M. S. CURTIS ET AL 2,644,222
MACHINE TOOL
Filed Aug. 22, 1947 18 Sheets-Sheet 10
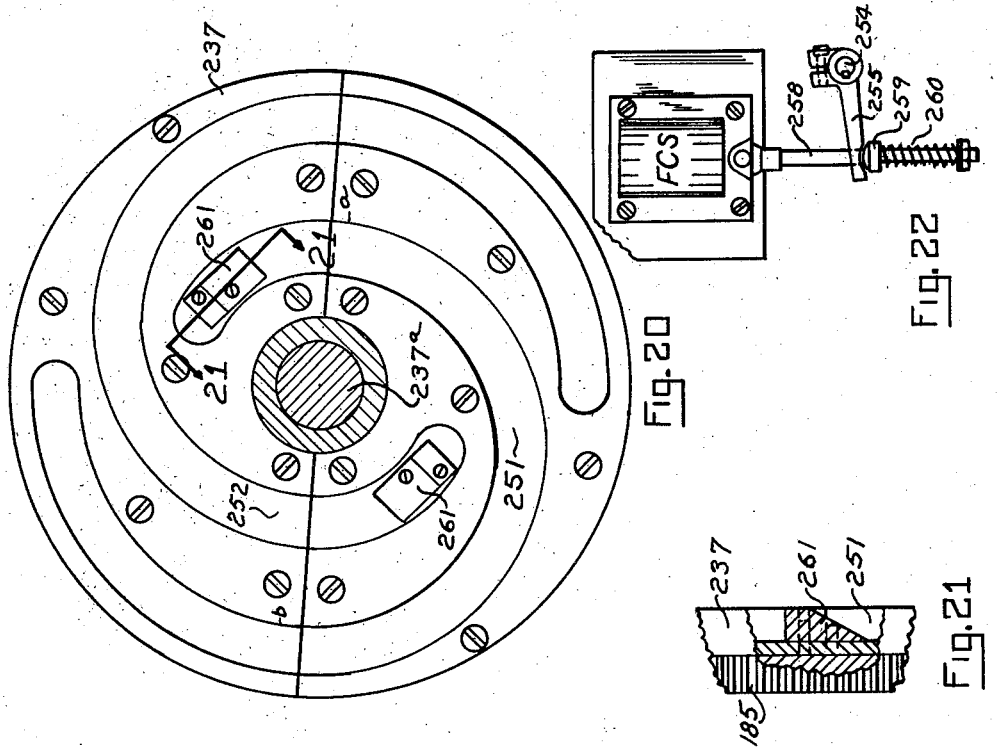
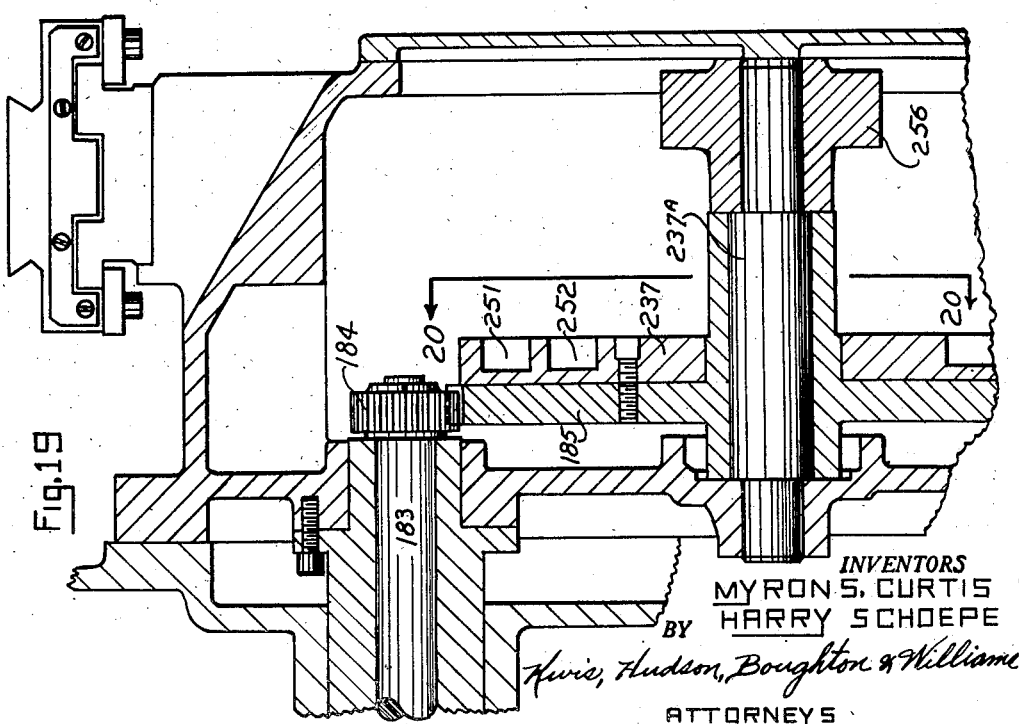
INVENTORS
MYRON S. CURTIS
HARRY SCHOEPE
BY
Kwis, Hudson, Boughton & Williams
ATTORNEYS July 7, 1953 M. S. CURTIS ET AL 2,644,222
MACHINE TOOL
Filed Aug. 22, 1947 18 Sheets-Sheet 11
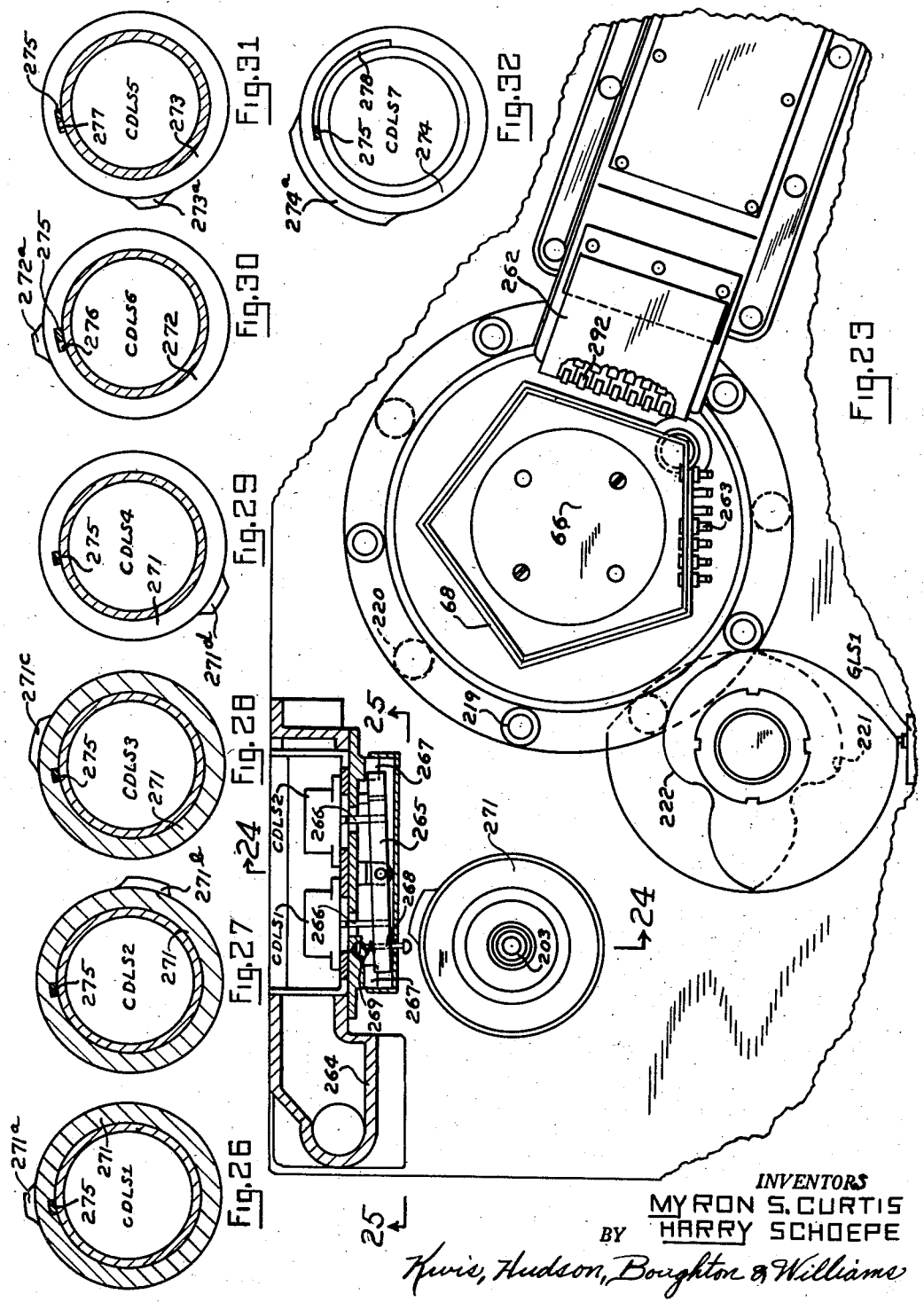
INVENTORS
MYRON S. CURTIS
BY HARRY SCHOEPE
Kwis, Hudson, Boughton & Williams
ATTORNEYS

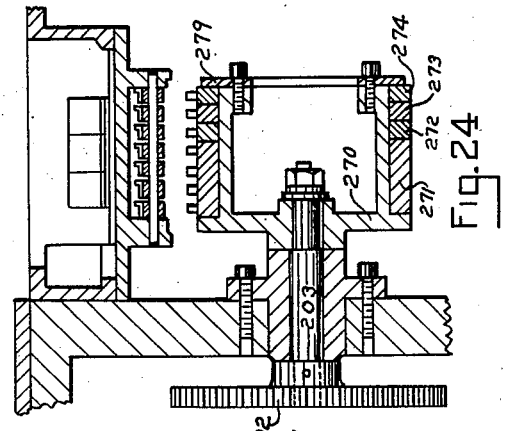
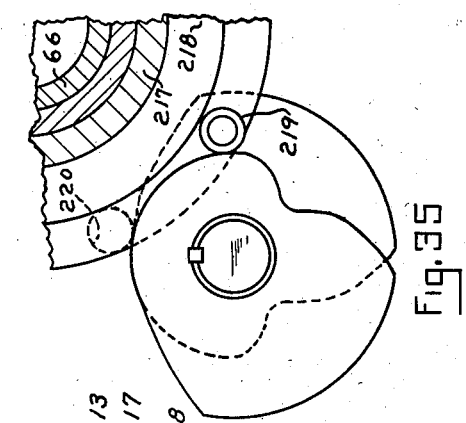
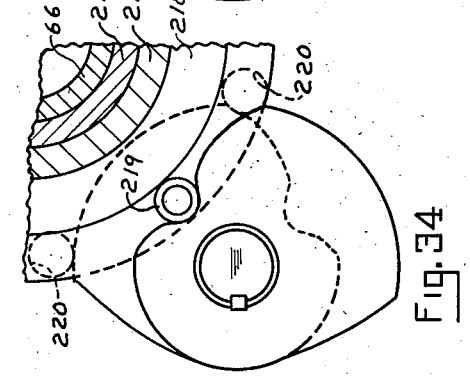
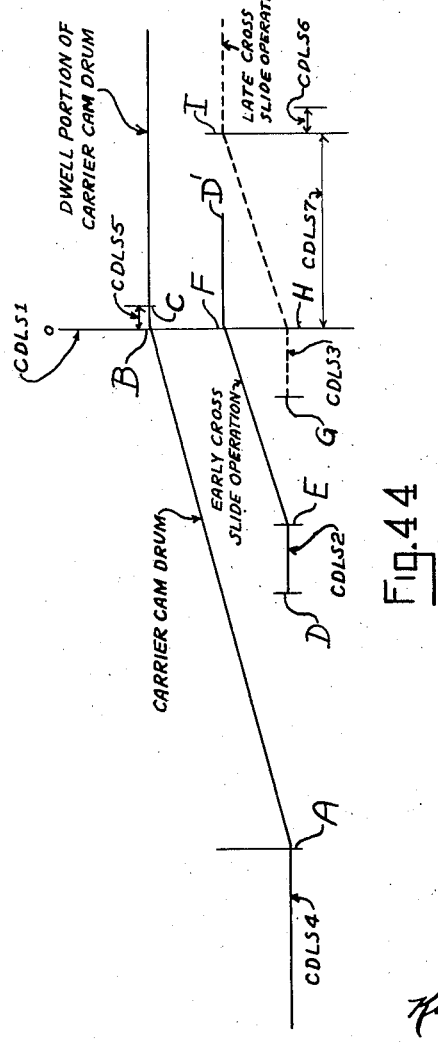
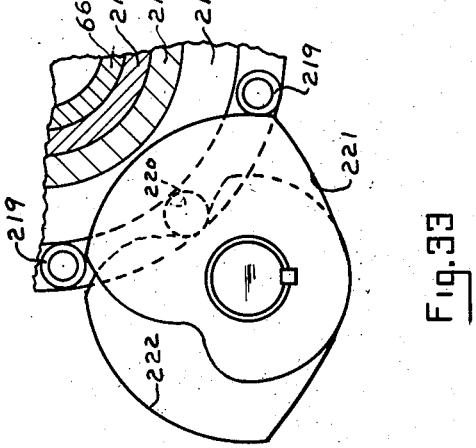

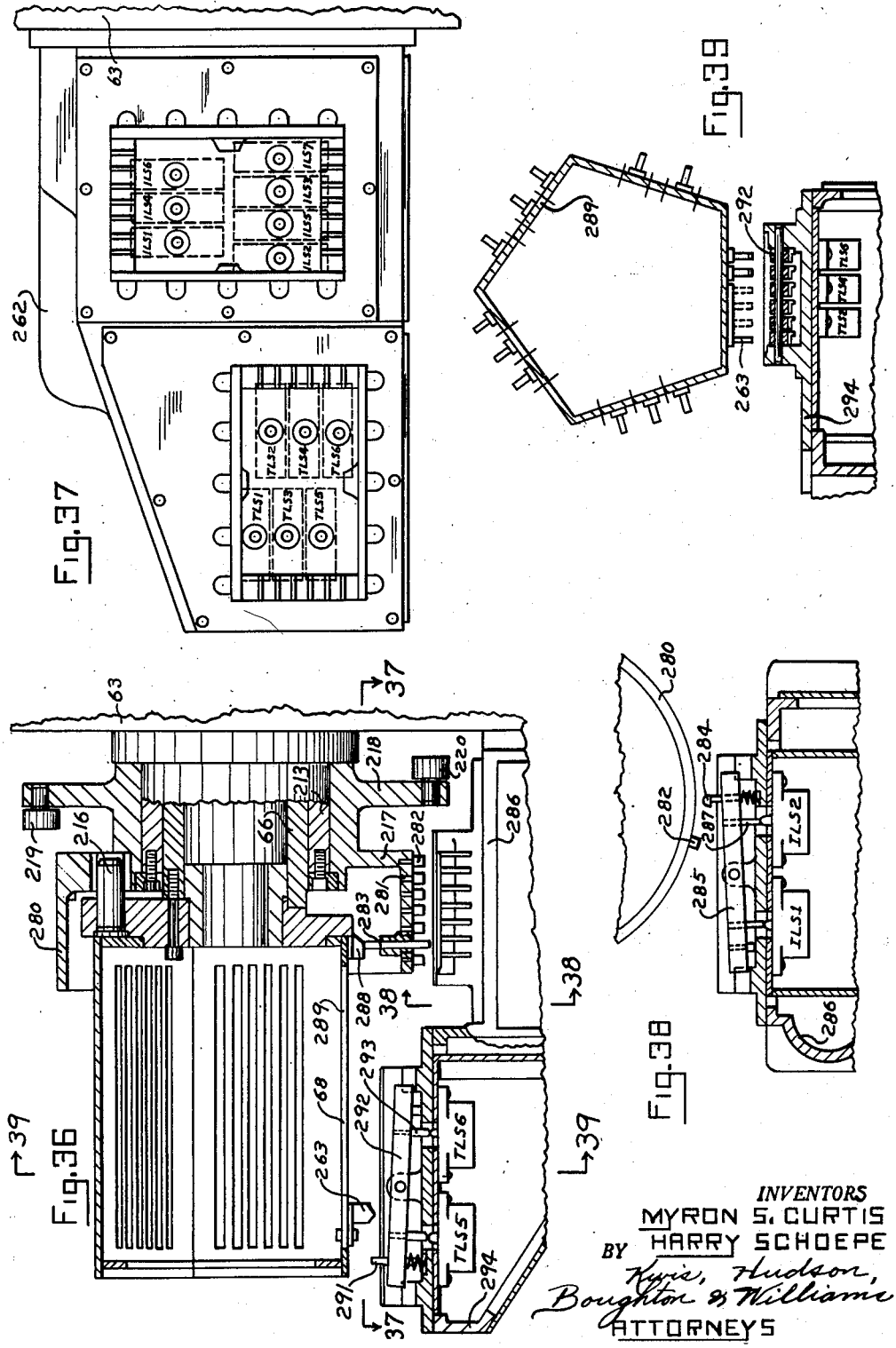

INVENTORS
MYRON S. CURTIS
HARRY SCHOEPE
BY Kwis, Hudson, Boughton & Williams
ATTORNEYS Patented July 7, 1953

2,644,222

UNITED STATES PATENT OFFICE 2,644,222

MACHINE TOOL

Myron S. Curtis and Harry Schoepe, Cleveland, Ohio, assignors to The Warner & Swasey Company, Cleveland, Ohio, a corporation of Ohio Application August 22, 1947, Serial No. 770,050

26 Claims. (Cl. 29—43)

This invention relates to a machine tool and more particularly to a single spindle automatic lathe.

An object of the invention is to provide an improved machine tool of the character specified and possessing great ease of setup, wherefore the machine tool is readily adapted for small lot operation as well as for continuous production operation.

A more specific object is to provide a machine tool as specified and wherein all of the adjustable or interchangeable parts are readily accessible, thus facilitating the setup of the machine.

Another object is to provide a machine tool of the character referred to wherein interchangeable cams are eliminated and the setup of the machine for various operating runs involves merely the adjustability of dogs which are freely accessible.

Another object is to provide a machine tool of the character referred to wherein during any operative step of the work cycle the spindle speed and the rate of feeding movement of the tool carrier and slide or slides can be varied as desired.

Another and more general object is to provide a machine tool of the character specified and which is compact and does not have substantial overhang of the parts and therefore possesses maximum rigidity and strength, thus insuring the accuracy of the machine and its efficiency of operation because of the reduction of torsional moments during machine operation.

Another object is to provide a machine tool of the character referred to which is so designed and proportioned as to clearances and size to enable the machine to operate on work pieces of a wide range of different sizes and including relatively large size work pieces, whereby the utility range of the machine is increased thus effecting savings in equipment cost.

A still further object is to provide a machine tool of the type specified which is so designed as to facilitate the tooling of the machine and thus tooling costs are maintained at a minimum.

Further and additional objects and advantages not hereinbefore specified will become apparent during the detailed description of an embodiment of the invention which is to follow.

Referring to the accompanying drawings illustrating said embodiment of the invention, Fig. 1 is a front elevational view of the machine tool.

Fig. 5 is a developed sectional view on a larger scale of the change speed transmission to the spindle.

Fig. 6 is a detail sectional view taken on line 6—6 of Fig. 5, looking in the direction of the arrows.

Fig. 7 is a developed sectional view of the feed train from the spindle to the rapid traverse motor shaft.

Fig. 8 is an end elevational view looking from the left hand side of Fig. 7.

Fig. 9 is a detached fragmentary sectional view through the knob and the door which carries it and which are shown in Fig. 8 in elevation.

Fig. 10 is a detached sectional view of the mechanism for shifting the two-step gear cone shown on the stub shaft in Fig. 5 and employed for imparting the "High" and "Low" speed ranges to the spindle.

Fig. 10a is a detached fragmentary sectional view taken substantially on line 10a—10a of Fig. 10, looking in the direction of the arrows.

Fig. 11 is an elevational view of a portion of the front of the headstock and is taken looking from the left hand side of Fig. 10.

Fig. 12 is a sectional view showing the drive train from the rapid traverse motor shaft to the actuating cam drum for moving the tool carrier and also showing the indexing motor for the tool carrier and a portion of the indexing drive from said latter motor to the tool carrier.

Fig. 15 is a partial sectional and partial end elevational view of the tool carrier and actuating cam drum taken looking from the left hand side of Fig. 13.

Fig. 16 is a detached fragmentary sectional view taken on line 16—16 of Fig. 15, looking in the direction of the arrows.

Fig. 17 is a view of the cross slides and the operating mechanism therefor and is partially in side elevation and partially in section.

Fig. 18 is a sectional view taken on irregular line 18—18 of Fig. 17, looking in the direction of the arrows.

Fig. 19 is a sectional view taken on line 19—19 of Fig. 17, looking in the direction of the arrows.

Fig. 20 is a detached sectional view taken along line 20—20 of Fig. 19, looking in the direction of the arrows.

Fig. 21 is a fragmentary sectional view taken substantially on line 21—21 of Fig. 20, looking in the direction of the arrows.

Fig. 22 is a detached elevational view of one of the cross slide solenoids and of certain parts operated thereby.

Fig. 23 is a fragmentary end elevational view looking at the control turret on the end of the tool carrier, with certain of the parts broken away and with other of the parts shown in section.

Fig. 24 is a fragmentary sectional view through the cam ring controlling drum and is taken substantially on irregular line 24—24 of Fig. 23, looking in the direction of the arrows.

Fig. 25 (Sheet 6) is a fragmentary view taken looking from the line 25—25 of Fig. 23, in the direction of the arrows, and with certain operating levers removed.

Figs. 26 to 29 inclusive (Sheet 11) are detached sectional views through the wide non-adjustable cam ring shown mounted on the control drum in Fig. 24, said views illustrating the different angular positions of the four cam lugs on the circumference of the ring.

Figs. 30 to 32 inclusive are sectional views showing in side elevation the three adjustable narrow cam rings mounted on the control drum shown in Fig. 24 and illustrating the positions of the cam lugs on said rings.

Figs. 33 to 35 inclusive (Sheet 12) show the indexing cams and the relationship they have to each other and to the indexing disk during the indexing cycle for the carrier.

Fig. 36 is a sectional view through a portion of the indexing mechanism for the tool carrier and of the control turret carried by said carrier and of the index control drum rotatably supported by the carrier and of the mechanisms operated by said turret and drum.

Fig. 37 is a plan view taken from the line 37—37 of Fig. 36, looking in the direction of the arrows, with the operating levers removed.

Fig. 38 is a sectional view taken substantially on line 38—38 of Fig. 36, looking in the direction of the arrows, with a portion of the index control drum shown in end elevation.

Fig. 39 is a sectional view through the control turret and its associated switch box, taken substantially on line 39—39 of Fig. 36, looking in the direction of the arrows.

Figs. 40 to 43 inclusive (Sheet 3) are partly elevational and partly sectional views through the solenoid actuated valves for controlling the hydraulic clutches in the spindle drive transmission, with the several views showing different operative positions of the various valves.

Fig. 44 (Sheet 12) is a timing chart illustrating the operational relationship of the tool carrier and the cross slides in an operative step of the work cycle for either "early" or "late" cross slide actuation.

Figure 45:
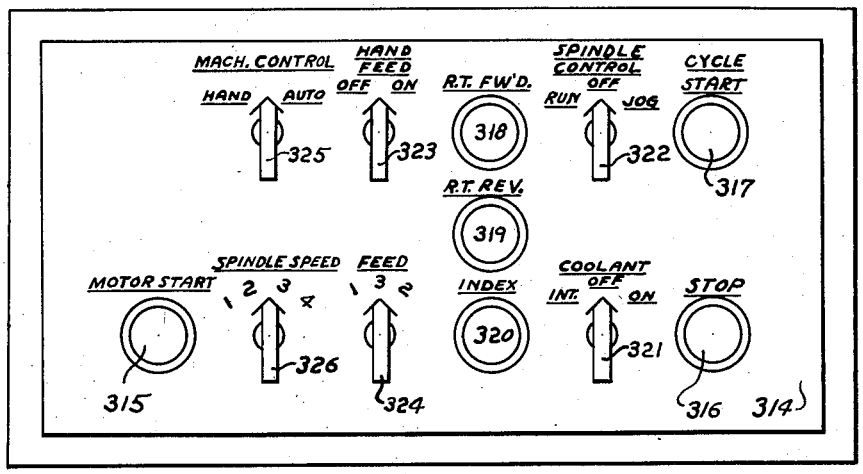
Figure 46:
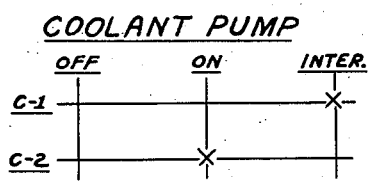
Figure 49:
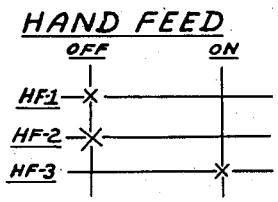

Fig. 45 (Sheet 14) is a front elevational view of the control panel mounted on the front of the headstock.

Figs. 46 to 51 inclusive are diagrams of the different positions of the following switches: Coolant pump, machine control, spindle control, hand feed, hand feed selector and hand spindle speed selector.

Figure 52:
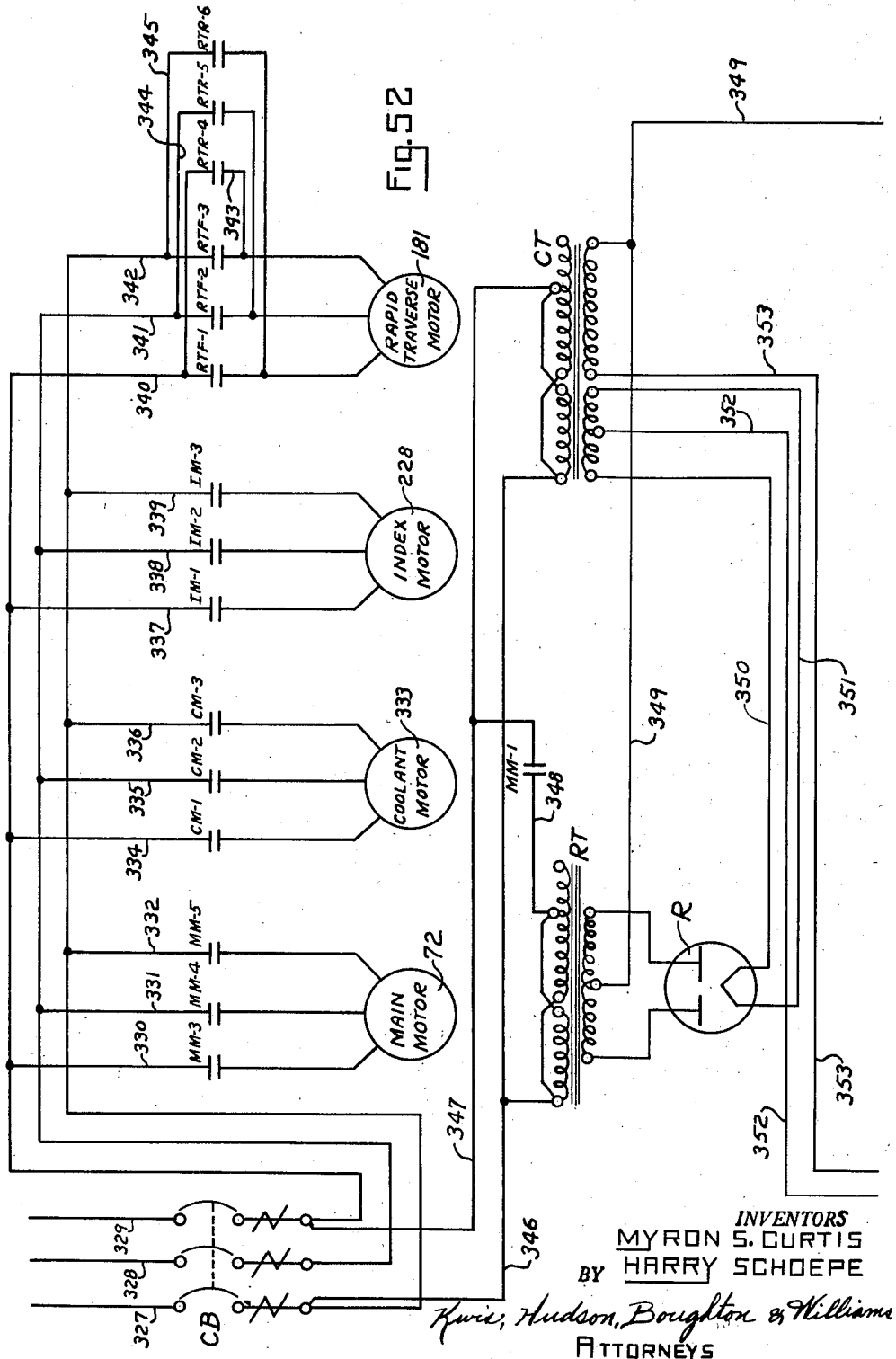

Fig. 52 (Sheet 15) is a diagram of the power circuit and the rectifier circuit.

Figure 53:
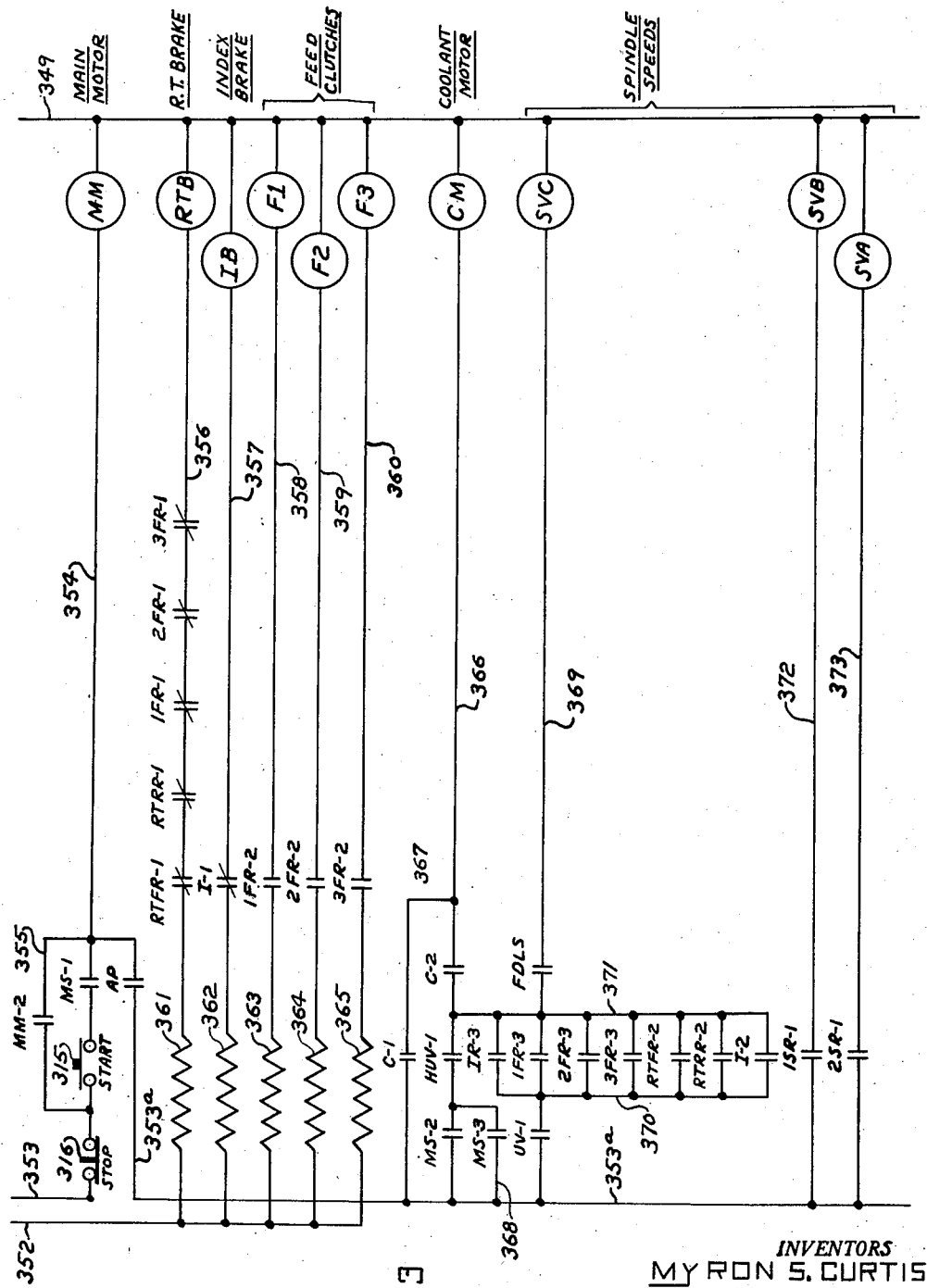
Figure 54:
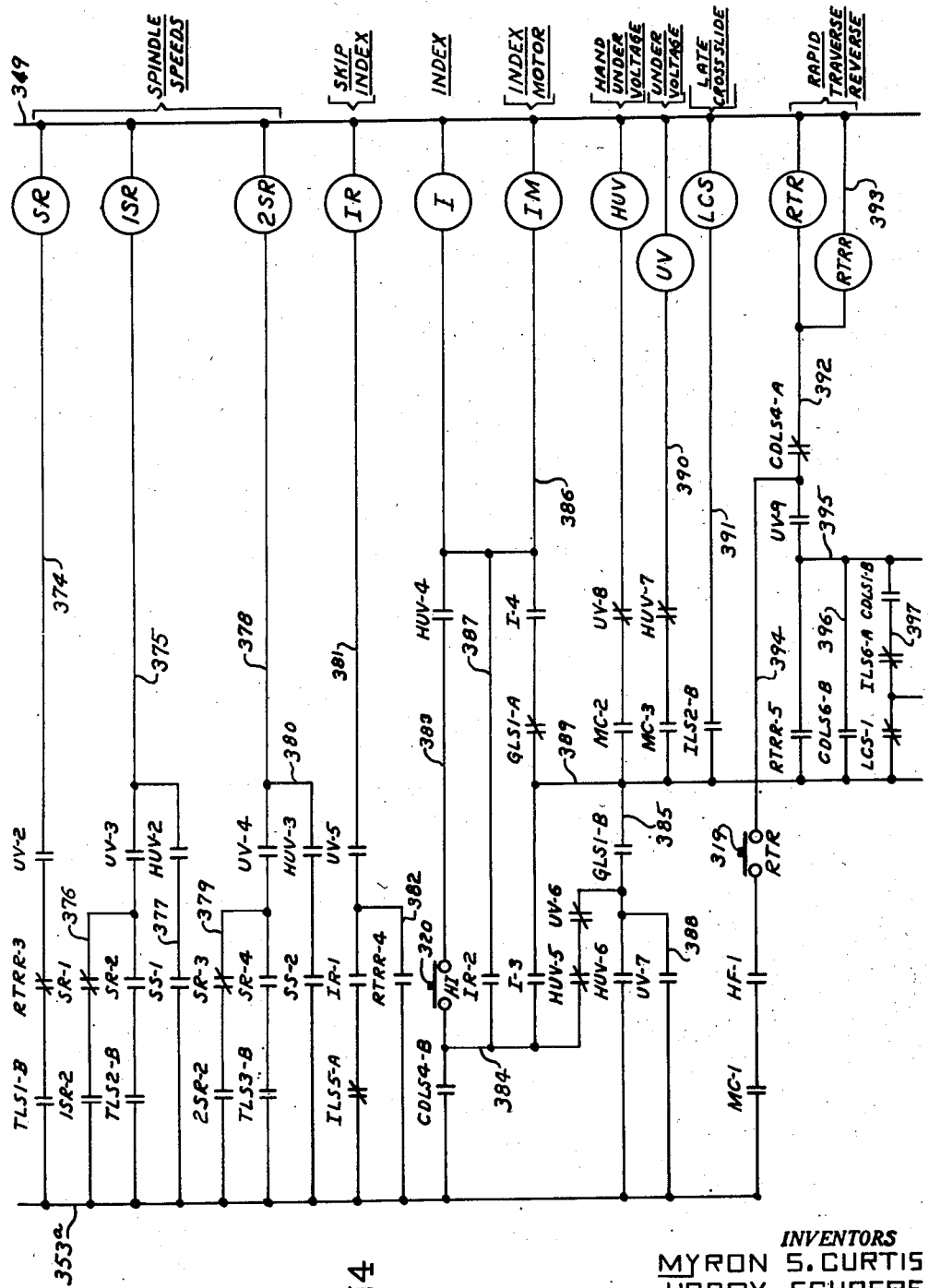
Figure 55:
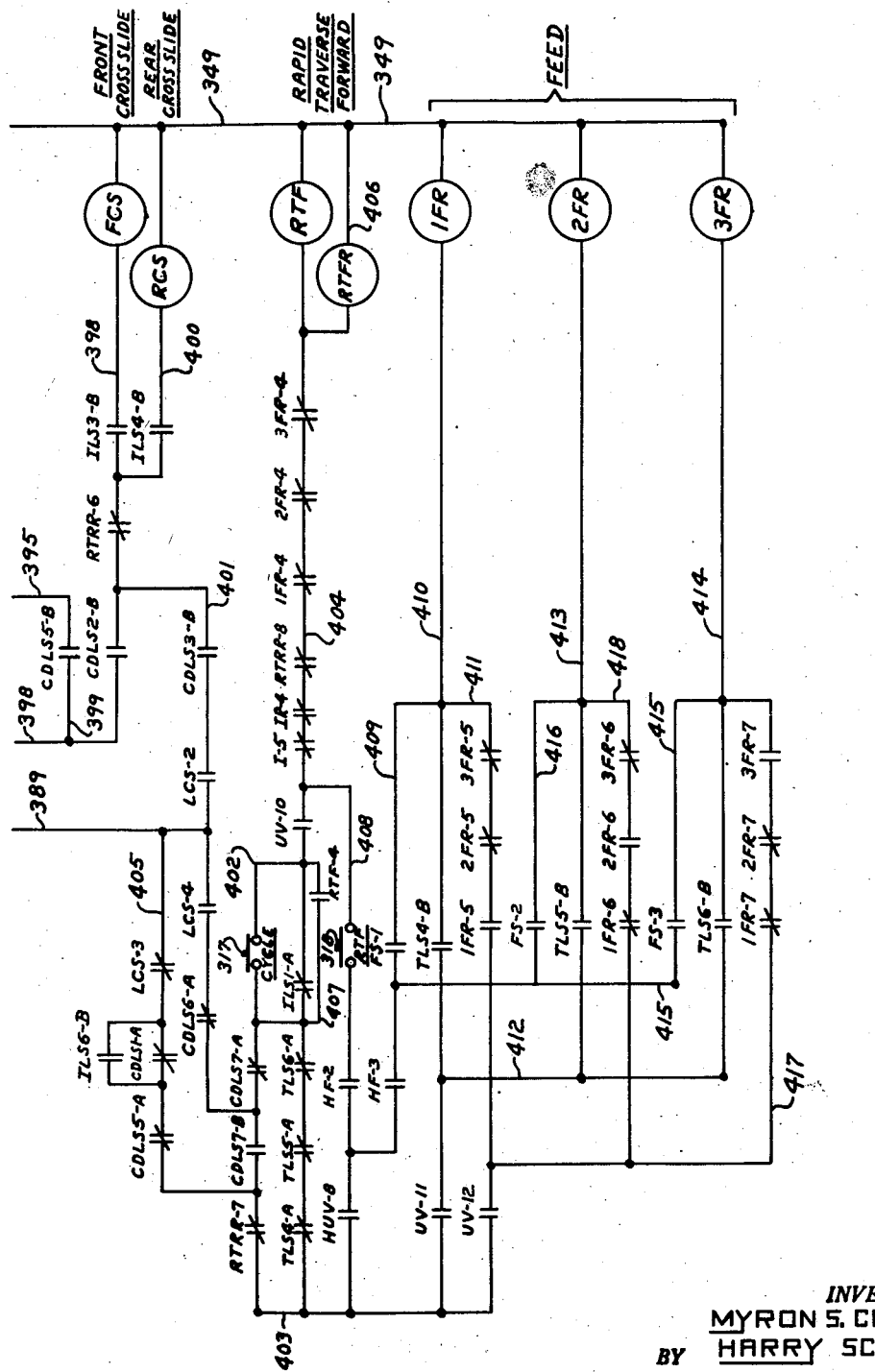

Figs. 53, 54 and 55 (Sheets 16, 17 and 18) constitute a diagram of the D. C. and A. C. electrical control circuits.

Referring first to Figs. 1 to 4 inclusive, the main elements or portions of the machine tool will now be described. The machine comprises a base 60, which supports the pan 61 and the vertically extending frame and housing portions, the part of which below the spindle may be termed the bed 62 while the remaining and upper part can be designated as the headstock 63. The headstock rotatably supports a spindle 64 which is provided on its outer end with a suitable chuck 65 as well understood in the art. The spindle will be called herein a work spindle, but it will be understood that it might be used as a tool spindle in certain instances. The chuck 65 will be called a work chuck but it might be used as a tool chuck.

The headstock 63 also supports for reciprocating movement and indexing rotation a carrier 66 which will be termed herein a tool carrier, although it will be understood that in some instances it may function as a work carrier.

The carrier 66 is provided on its right hand end (as viewed in Fig. 1) with an axially elongated polygonal portion 67 provided with means for adjustably mounting tools thereon. The amplitude of the reciprocating movement of the carrier is constant but different lengths of cuts can be obtained by adjusting the cutting tools axially of the faces of the portion 67. The left hand end of the carrier mounts a control turret 68.

The bed 62 is provided on its right hand side (as viewed in Fig. 1) with an extension 69 having on its upper surface upwardly inclined ways on which slide the front cross slide 70 and the rear cross slide 71.

It will be noticed that the machine in its entirety is compact and provides for minimum overhang of the various portions or parts thereof, thus improving the rigidity of the machine and lessening torsional moments therein during operation, and hence improving the accuracy and the efficiency of the machine.

The machine further includes a main motor 72 mounted on the base 60 exteriorly of the bed 62. The main motor 72 is of the non-reversible constant speed type and has its shaft coupled to a main drive shaft 73 extending into the bed 62 and rotatably supported therein in suitable bearings, see Fig. 5.

*Spindle drive transmission*

The shaft 73 has freely rotatable on it a gear 74 with the sleeve portion of said gear carrying a friction clutch plate 75. The shaft 73 also has freely rotatable thereon in spaced relationship to the gear 74 a gear 76, the sleeve portion of which carries a friction clutch plate 77. Intermediate the adjacent ends of the sleeve portions of the gears 74 and 76 a clutch housing member 78 is fixed on the shaft 73 to rotate therewith and said member 78 at one end thereof mounts a series of friction clutch plates 79 adapted to cooperate with the clutch plate 75 and at the other end thereof a series of clutch plates 80 adapted to cooperate with the clutch plate 77.

The clutch housing member 78 is also provided with circular recesses which slidably mount ring pistons or clutch actuators 81 and 82 having portions adapted to engage the adjacent clutch plates 79 or 80 to move the clutch plates 79 or 80 into driving engagement with the clutch plates 75 or 77 as the case may be. The clutch actuators 81 and 82 are normally held in inactive position by springs 83 but are adapted to be moved by pressure fluid against the action of said springs to effect driving engagement of the clutch plates, wherefore the gear 74 or the gear 76 can be clutched to and driven by the shaft 73 as the case may be.

The bed 62 is provided with passages 84 and 85 which are connected to a source of pressure fluid as will later be explained. The passage 84 communicates with a circumferential groove 86 formed in the shaft 73. The groove 86 communicates with a passage 87 in the shaft 73 and which communicates with groove 88 formed in the periphery of the shaft and extending axially thereof and communicating with a port 89 extending to the recess in which is mounted the piston or actuator 81. The passage 85 in the bed 62 communicates with an annular peripheral groove 90 in the shaft 73 and which is connected by a passage 91 in said shaft with an axially extending peripheral groove 92 therein which communicates with a port 93 that extends to the recess in which is mounted the piston or actuator 82.

It will thus be seen that when pressure fluid is supplied to passage 84 the piston or actuator 81 will be moved against its spring 83 to engage the clutch plates 75 and 79 to clutch the gear 74 to the shaft 73. It will also be seen that when pressure fluid is supplied to the passage 85 the piston or actuator 82 will be moved against its spring 83 to engage the clutch plates 77 and 80 to clutch the gear 76 to the shaft 73. The control for the supply and the draining of pressure fluid to and from the passages 84 and 85 will be explained in detail hereinafter. The clutches for connecting the gears 74 and 76 to the shaft 73 will be referred to hereinafter, respectively, as clutches C2 and C1.

The gear 74 meshes with a gear 94 fixed on a shaft 95 rotatably supported in the bed. The gear 76 meshes with a gear 96 also fixed on the shaft 95. The shaft 95 beyond the gear 94 extends into a chamber formed exteriorly of the bed and normally closed by a removable cover plate and this extended portion of the shaft has splined thereon a gear 97 which meshes with a larger gear 98 splined on a rotatable shaft 99 supported by the bed and extending from the interior thereof into said chamber. The gears 97 and 98 are pickoff gears and as is well understood can be removed and a set of gears of a different ratio applied to the shafts 95 and 99. The inner or right hand end of the shaft 99 as viewed in Fig. 5 has formed thereon an enlarged cup-shaped portion 100 carrying on its circumference a series of clutch plates 101. The gear 96 meshes with a gear 102 freely rotatable on a shaft 103 which is rotatably supported in the bed and has its left hand end as viewed in Fig. 5 extending into and rotatably supported in the cup-shaped portion 100 of the shaft 99. The gear 102 has a sleeve portion which is provided on its periphery with a clutch plate 104.

A clutch housing member 105 similar to the clutch housing member 78 is keyed to the shaft 103 intermediate the cup-shaped portion 100 of the shaft 99 and the sleeve portion of the gear 102. The clutch housing member 105 is tubular at its opposite ends and overlies or surrounds the cup-shaped portion 100 and the sleeve of the gear 102 with the respective tubular ends of the member 105 provided internally with clutch plates 106 and 107 adapted to cooperate respectively with the clutch plates 101 and 104. The clutch housing member 105 internally and adjacent its tubular ends is provided with annular recesses in which clutch actuators or pistons 108 and 109 are slidably mounted to be moved by pressure fluid against the action of springs 110 to engage the clutch plates 101 and 106 to clutch the shaft 103 to the shaft 99 or to engage the clutch plates 104, 107 to clutch the gear 102 to the shaft 103.

The shaft 103 extends into a block 111 secured to an interior wall of the bed and provided with passages 112 and 113 which are adapted to be connected to a source of pressure fluid as will later be explained. The passage 112 communicates with an annular peripheral groove 114 formed in the shaft 103 and said groove 114 is in communication with the hollow interior 115 of the shaft 103 by means of a port 116. The hollow interior 115 of the shaft 103 extends axially of the shaft and communicates by means of a port 117 formed in the shaft with an axially extending peripheral groove 118 also formed in the shaft and communicating by means of a port 119 formed in the clutch housing member 105 with the recess therein in which is mounted the piston actuator 108. A tube 120 extends axially of the hollow interior 115 of the shaft 103 beyond both the ports 116 and 117 and is supported in spaced relationship to the wall of the hollow interior by means of suitable supporting and sealing sleeves located in the hollow interior. The right hand end of the hollow interior of the shaft 103 beyond the end of the tube 120 is closed by a suitable removable closure plug. The passage 113 communicates with an annular peripheral groove 121 formed in the shaft 103 and communicating in turn with the hollow interior 115 of said shaft by means of a port 122. Inasmuch as the said port 122 is adjacent the outer end of the sealing sleeve which supports the tube 120 it will be seen that said port is in communication with the interior of the tube 120 extending through the shaft. The left hand end of the tube 120 being beyond the left hand supporting sleeve for the tube is sealed from the port 117 but is in communication with a port 123 formed in the shaft 103 and communicating in turn with an axially extending peripheral groove 124 formed in the shaft 103 and in communication with a port 125 in the housing 105 and extending to the recess in which the piston actuator 109 is mounted.

From the foregoing it will be apparent that if pressure fluid is supplied to the passage 112 the piston actuator 108 will be moved against the action of the spring 110 to interengage the clutch plates 101 and 106 and clutch shafts 99 and 103 together, it being understood that at such time the passage 113 is connected to drain. When the supply of pressure fluid is connected to the passage 113 and the passage 112 is connected to drain, then pressure fluid is supplied through the tube 120 to move the piston actuator 109 toward the right against the action of its spring 110, to thus engage the clutch plates 104 and 107 to clutch the gear 102 to the shaft 103. The clutches for connecting the shafts 99 and 103 and the gear 102 and the shaft 103 hereinafter will be designated, respectively, as clutches C3 and C4. The means for controlling the supply of pressure fluid to the passages 112 and 113 and for connecting said passages to drain will be described hereinafter.

From the description thus far given it will be noted that the shaft 95 can be driven from the shaft 73 at either one of two different speeds depending upon whether the gear 74 or the gear 76 is clutched to the shaft 73 by the clutch C2 or C1. It will also be understood that if the shaft 99 is clutched to the shaft 103 by the clutch C3 then said latter shaft can be driven from the shaft 95 at one or the other of two different speeds. Likewise if the gear 102 is clutched to the shaft 103 by the clutch C4 and the shaft 99 is disconnected from the shaft 103, then the shaft 103 can be driven from the shaft 95 through the gear 96 at either one of two additional different speeds. Consequently the shaft 103 can be driven from the main drive shaft 73 through selective engagement of the clutches C1, C2, C3 or C4 previously described at any one of four different speeds.

The shaft 103 intermediate the gear 102 and the block 111 has fixed to it an elongated gear 126 which meshes at all times with the larger gear 127 of a two-step gear cone that is endwise shiftable on a stub shaft 128 mounted in the bed. The larger gear 127 of said two-step gear cone can be intermeshed with a gear 129 fixed on the spindle 64 or the gear cone can be axially shifted to disengage the gears 127 and 129 and intermesh the smaller gear 130 of the gear cone with the larger gear 131 that is also fixed to the spindle 64 adjacent to the smaller gear 129. (See Fig. 7.) When the two-step gear cone is shifted to intermesh the gears 127 and 129 the spindle 64 can be driven from the shaft 103 at any one of four different speeds in the "High" speed range while when said cone is shifted to intermesh the gears 130 and 131 the spindle 64 can be driven from the shaft 103 at any one of four different speeds in the "Low" speed range. The effect of this arrangement is that the spindle 64 can be driven at any one of eight different speeds, four in the "High" speed range and four in the "Low" speed range.

The driving of the spindle in either the "High" or "Low" speed range is effected manually by the arrangement for shifting the two-step gear cone now about to be described, while the driving of the spindle at any one of four different speeds in either range is effected manually or automatically by an arrangement which will be set forth in detail hereinafter. Also the pickoff gears 97 and 98 provide for varying the spindle speeds.

Figure 2:
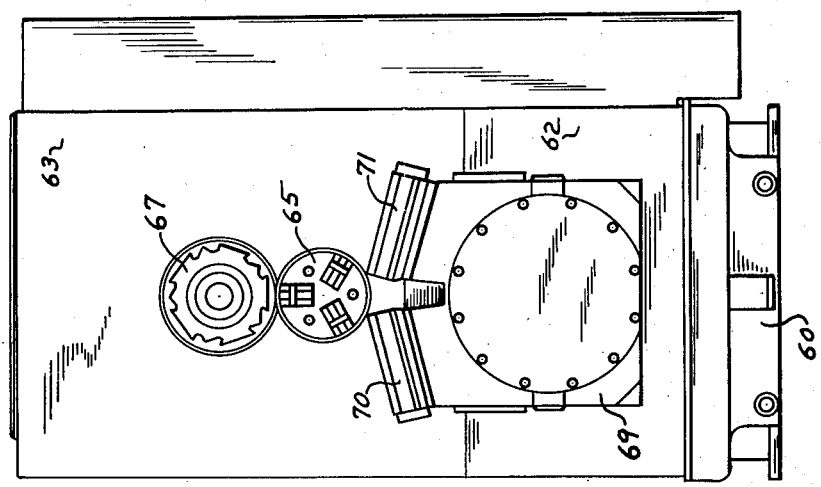
Fig. 2 is an end elevational view thereof looking from the right hand side of Fig. 1.
Figure 1:
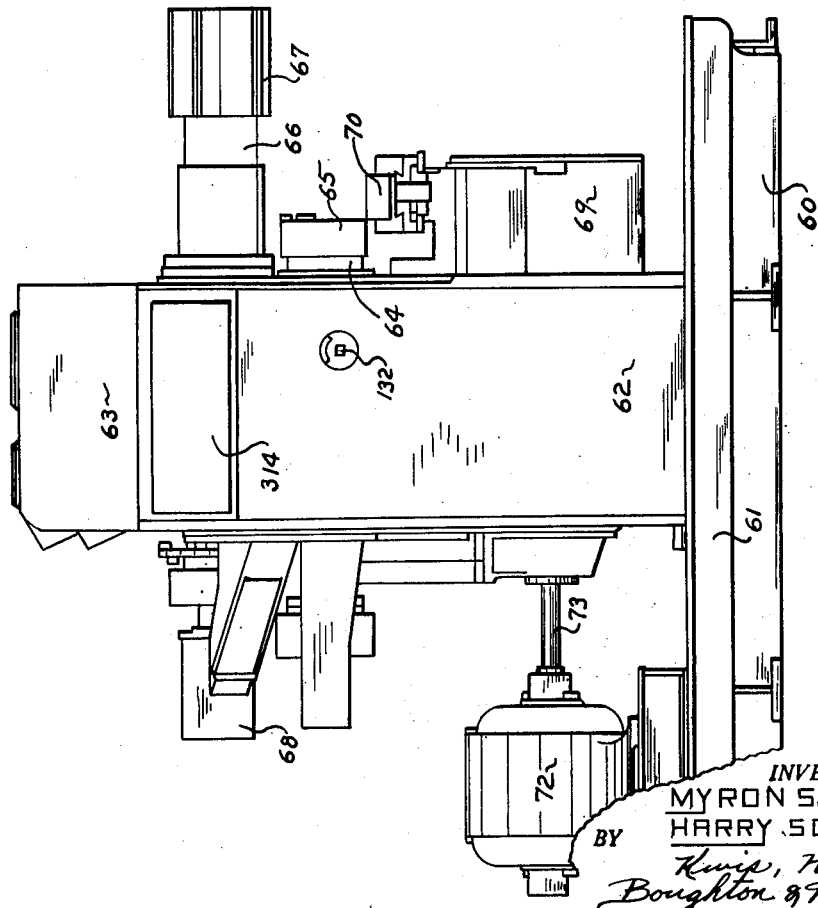

The front wall of the headstock 63 rockably supports a shaft 132, the outer end of which is squared for the reception of a wrench and is accessible from the front of the machine, see Figs. 1, 10 and 11. The outer or left hand end of the shaft 132 extends through a hollow housing portion of the headstock wall and through an opening in the front of the headstock and has slidably mounted thereon a disk 133 which is normally held by a spring 134 in its most left hand position and against the inner side of the front of the machine. The disk 133 being mounted on the squared wrench receiving end of the shaft 132 will rock with said shaft but can have endwise movement relative thereto. The disk is provided with two arcuately spaced openings 135, one or the other of which interlocks with the head of a cap screw 136 to retain the disk 133 and the shaft 132 against rocking movement out of either the "High" or "Low" speed range position.

Referring particularly to Fig. 10, it will be understood that when a wrench is applied to the outer end of the shaft 132 then the disk 133 is moved against the action of the spring 134 inwardly or toward the right to disengage the particular opening 135 from the head of the screw 136 and thus to free the disk and the shaft 132 for rocking movement to shift the two-step gear cone on the shaft 128. When the shifting has been accomplished and the wrench removed the disk 133 will again be moved outwardly by the spring 134 to interlock an opening 135 to the head of the screw 136 to lock the disk and shaft against rocking movement.

In order to transmit the rocking movement of the shaft 132 to the two-step gear cone to obtain either "High" or "Low" speed range for the spindle, said shaft 132 has fixed to its inner end an arm 137 which mounts at its free end a shoe 138 engaging in the annular groove 139 of the two-step gear cone, see Figs. 5, 10 and 11.

It will be noted by reference to Fig. 5 that the larger gear 127 of the two-step gear cone limits shifting movement of the cone toward the right when the smaller gear 130 is to be intermeshed with the gear 131, while the left hand end of the gear cone will engage the wall of the headstock and limit left hand shifting movement of the cone in intermeshing the gears 127 and 129. Hence when the gear cone is shifted to either one of its two operative positions, an opening 135 will be aligned with the head of the screw 136 to be interlocked therewith as the disk moves outwardly under the action of the spring 134 upon the removal of the wrench.

It will be noted that when the power drive to the spindle 64 is interrupted by the disengagement of the clutches C1 and C2, the rotation of the spindle can be braked by the concurrent engagement of clutches C3 and C4, since the gear ratios between the shafts 95 and 99 and the shafts 95 and 103 are different and hence would effect a braking action on the rotation of the spindle.

Feed transmission

The feeding movements imparted to the tool carrier or to the cross slides is in timed relation to the rotation of the spindle since the feed train is driven from the spindle by a gear 140 fixed to the spindle, see Fig. 7. The gear 140 constantly meshes with a gear 141 fixed to one end of a short shaft 142 that is rotatably supported in the headstock. The opposite end of the shaft 142 has fixed thereto a gear 143 which constantly meshes with a gear 144 that is freely rotatable on a stub shaft 145. The gear 144 constantly meshes with the larger gear 146 of a two-gear cluster that is freely rotatable on a shaft 147 rotatably mounted in the bed. The smaller gear 148 of said two-gear cluster constantly meshes with a gear 149 that is fixed to a rotatable shaft 150 supported in the wall of the bed. The shaft 150 is located centrally of three other shafts parallel to it and drives said shafts by means of the pickoff gears 151, 152 and 153. The pickoff gear 151 meshes with a pickoff gear 154 splined to the shaft 147 which is one of the three shafts referred to. The shaft 147 has fixed thereto a gear 155 which meshes with a gear 156 freely rotatable on a shaft 157 and having an elongated sleeve portion 156a on which is keyed the ring 158 of a magnetic clutch F3. This magnetic clutch is provided with a second ring 159 keyed to the shaft 157, wherefore when the clutch coil is energized the driving of the gear 156 by the gear 155 results in driving the shaft 157.

The pickoff gear 152 on the shaft 150 meshes with a pickoff gear 160 splined on the shaft 161, which is another of the three shafts extending parallel to and surrounding the shaft 150. The shaft 161 has fixed to its inner end a gear 162 which meshes with a gear 163 fixed to a ring 164 freely rotatable on the shaft 157 and forming part of a magnetic clutch F2. The magnetic clutch F2 also includes the ring 165 keyed to the shaft 157, wherefore when the coil of said clutch is energized rotation of the shaft 161, gear 162 and gear 163 imparts rotation to the shaft 157.

The pickoff gear 153 on the shaft 150 meshes with a pickoff gear 166 splined to the shaft 167 and which is another of the three shafts previously referred to surrounding the shaft 150. The shaft 167 has fixed thereto a gear 168 which meshes with a gear 169 secured to a ring 170 freely rotatable on the shaft 157 and forming part of a magnetic clutch F1. The magnetic clutch F1 also includes the ring 165 keyed to the shaft 157 which forms also part of the magnetic clutch F2. It will be seen that when the magnetic clutch F1 is energized the shaft 167 through the gears 168 and 169 drives the shaft 157.

From the foregoing it will be evident that the shaft 157 can be driven at any one of three different feeding rates from the spindle 64 depending upon which of the magnetic clutches F1, F2, or F3 is energized.

It will also be understood that these three different feeding rates can be varied by changing the pickoff gears on the shafts 150, 147, 161 and 167, access to which pickoff gears is obtained by opening the door 171, see Figs. 7, 8 and 9.

The door 171 carries a knob 172 fixed to a rotatable knob spindle 173 provided with a threaded portion 174 that can be screwed into a threaded opening in the wall of the bed to hold the door 171 in closed position. When the screw portion 174 is thus screwed into the threaded opening, the inner end of the knob spindle 173 engages and moves the button of a normally open switch FDLS1 to close the contacts thereof as long as the door is secured in closed position. Whenever the door is opened said normally open switch automatically interrupts the circuit to prevent operation of the work spindle and the feed transmission as will later be pointed out.

The shaft 157 has fixed to its right hand end as viewed in Fig. 7 a gear 175 which meshes with a gear 176 fixed to a rotatable shaft 177 mounted in the bed. The shaft 177 also has fixed thereto a gear 178. The gear 176 meshes with a gear 179 fixed to the shaft 180 of the reversible rapid traverse motor 181, see Fig. 12, Sheet 6. The gear 178 meshes with a gear 182 fixed on a rotatable shaft 183 which also has fixed thereto a gear 184 constantly in mesh with the gear 185 fixed to the actuating cam for the cross slides and later to be referred to (see Fig. 19, Sheet 10).

The shaft 180 of the rapid traverse motor 181 has the rotor of said motor fixed thereto and on its left hand end as viewed in Fig. 12 has fixed thereto a collar 186 which on its right hand or inner side is provided with a plurality of projecting pins 187. The shaft 180 intermediate the collar 186 and the motor housing freely rotatably mounts a pair of disks 188 and 189, the adjacent faces of which are in contact with each other and said disks are held in contact with the housing 190 of a brake for the shaft 180 by means of a number of coil springs 191 carried by the collar 186. The brake is a magnetic brake with the coil thereof indicated in Fig. 12 as RTB and said brake will hereinafter be referred to as the rapid traverse brake. The pins 187 carried by the collar 186 extend through openings in the disks 188 and 189 and hence rotation of the collar 186 with the motor shaft 180 imparts rotation to said disks but as soon as the coil RTB is energized said disks are held against rotation and thus the rotation of the shaft 180 is braked.

The gear 179 on the rapid traverse motor shaft 180 meshes with the larger gear 192 of a two gear cluster, the smaller gear 193 of which meshes with gear 194 fixed to one end of a shaft 195 the opposite end of which has fixed thereto a gear 196. The gear 196 meshes with a gear 197 fixed to the actuating cam drum 198 that is freely rotatable on shaft 199 but is held against endwise movement thereon. The drum 198 is provided with a spiral cam groove 200 with said groove having a dwell portion 200a at one end. The gear 197 has fixed thereto a gear 201 which meshes with a gear 202 fixed to the cam ring control drum shaft 203 and later to be referred to.

It will be seen that the actuating cam drum 198 can be rotated in opposite directions at a rapid traverse rate by the reversible rapid traverse motor 181 or it can be rotated in one direction only at various feeding rates as hereinafter described. It will be understood that whenever the actuating cam drum 198 is being driven at feed or rapid traverse, then the rapid traverse brake RTB will be deenergized and the brake is released. During feed drive the shaft 180 and the rotor of rapid traverse motor 181 rotate idly.

*Tool carrier*

Figure 13:
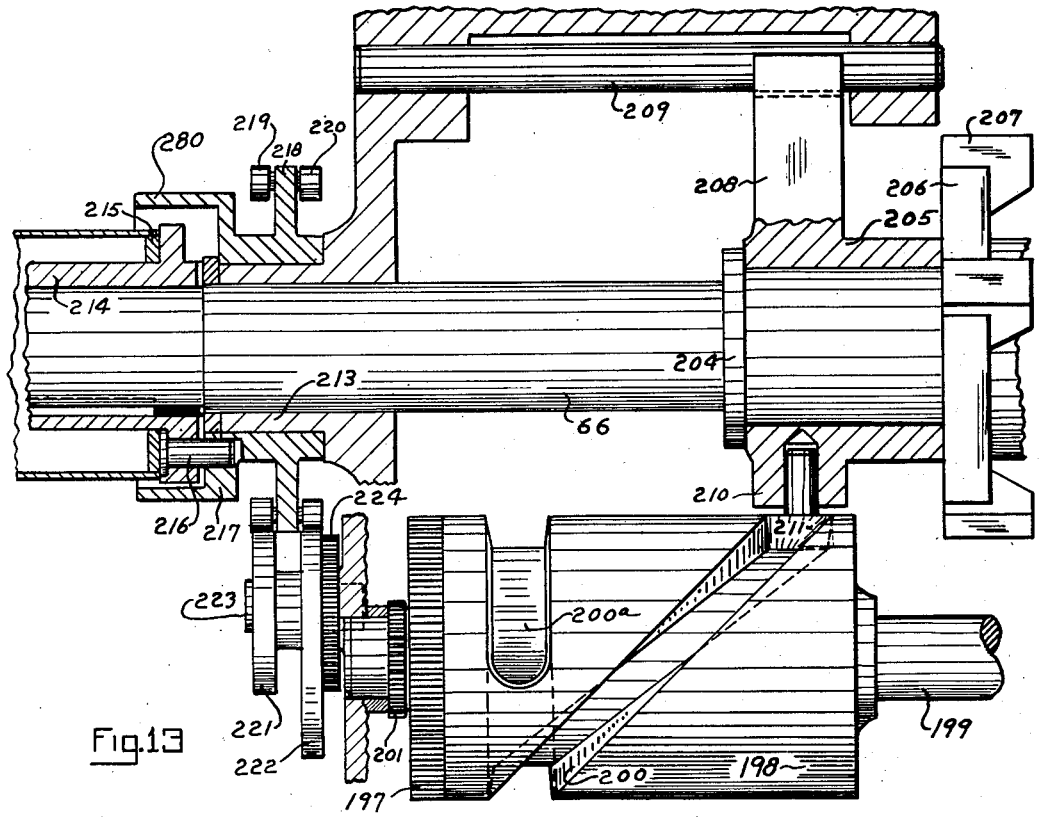
Fig. 13 is a sectional view showing a portion of the tool carrier and the actuating cam drum for reciprocating the same and also the indexing mechanism for indexing the carrier, the tool carrier and the parts being shown in the relationship they have for the indexing operation, the section being taken along line 13—13 of Fig. 15 (Sheet 8) looking in the direction of the arrows.
Figure 14:
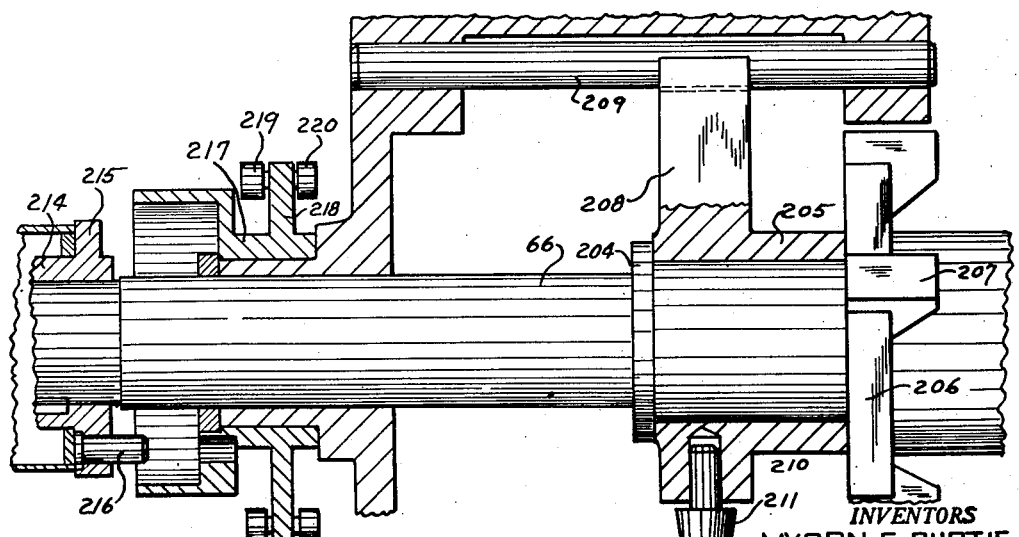
Fig. 14 is a view similar to Fig. 13 with certain of the parts omitted and with the tool carrier shown in the position it has during its reciprocating movement.

Referring to Figs. 13 and 14 (Sheet 7) it will be seen that the tool carrier 66 is provided intermediate its ends with a shoulder 204 against which and surrounding the shaft is mounted a motion transmitting member 205. This member is retained against the shoulder 204 by means of a spider 206 having thereon a plurality of projecting lugs 207 corresponding in number and spacing with the faces of the polygonal tool mounting portion 67 of the tool carrier. The spider 206 is fixed to the tool carrier 66 and hence reciprocates and indexes with said carrier. The motion transmitting member 205 is provided with an outwardly extending arm 208 having a forked outer end straddling a guide bar 209 that is fixedly mounted in the walls of the headstock. In addition the member 205 is provided with a boss 210 which carries a pin or stud having a roller 211 that engages in the spiral groove 200 of the actuating cam drum 198, wherefore rotation of this cam drum in either direction causes axial movement of the member 205 and the carrier 66, as well as the spider 207.

When the tool carrier 66 moves axially from its most right hand or indexing position toward the left, the spider 206 moving with the carrier results in the lug 207 which is aligned with a horizontal longitudinally extending guideway 212 entering said guideway, such entrance being facilitated by the flared end of the latter. As soon as the lug 207 has entered the guideway 212 rocking movement of the carrier 66 is prevented and hence tools carried on the portion 67 will be accurately held during their cutting periods in a machining operation.

The carrier extends beyond a supporting boss 213 of the headstock and is provided on said extension with a sleeve 214 that is keyed to the carrier and a flange 215 on the control turret 68 carries a pin or stud 216 adapted to be received within an opening provided in an indexing member 217 that is freely rotatable on the exterior of the boss 213 but is held against endwise movement thereon (see Fig. 14). The indexing member 217 has an indexing flange or disk 218 provided in its opposite faces with a plurality of equally and circularly spaced cam followers 219 and 220, with the cam followers 219 on one face staggered circularly with respect to the cam followers 220 on the other face (see Figs. 13 and 14, Sheet 7, and 33, 34 and 35, Sheet 12).

The cam followers 219 and 220 cooperate respectively with cams 221 and 222 keyed to a shaft 223 rotatably supported in the headstock. The cams 221 and 222 are identical in shape, but are angularly displaced and oppositely disposed and, as stated, have peripheries cooperating with the cam followers, wherefore rotation of the shaft 223 will cause the cams to index the indexing member 217 and through its connection with the sleeve 214 by the pin 216 to index said sleeve and the carrier 66. The cam 222 at the start and at the completion of its indexing rotation actuates a double contact limit switch GLS1, for a purpose later to be explained. Also the said cams 221 and 222 function to lock the member 217 and the carrier 66 in indexed position. Inasmuch as the construction of the cams 221 and 222 and the manner in which they function to index the member 217 are fully set forth and explained in the copending application of Myron S. Curtis, Serial No. 684,594, filed July 18, 1946, now Patent No. 2,579,368, granted December 18, 1951, the details of the peripheries of said cams need not be explained herein, reference being made to said copending application. It should suffice to say that each cam periphery includes a driving portion, an arcuate portion, a restraining or regulating portion and a second driving portion, with the said restraining or regulating portion and the second driving portion connected by a portion having a curvature substantially equal to that of the cam followers, while the two driving portions are united by a second arcuate portion having a central radius of curvature greater than the first mentioned arcuate portion.

It will be understood that when one cam is in driving contact with its cam follower the other cam will have a regulating or restraining effect on its cam follower and therefore the member 217 and the carrier can be rotated or indexed only under control of the cams and cannot overrun or otherwise independently rotate due to any unbalanced weight distribution. Reference to Figs. 33 to 35 inclusive (Sheet 12) taken in conjunction with the description set forth in said copending application Serial No. 684,594 clearly and fully brings out the function and purpose of the cams 221 and 222.

It will be noted that as the carrier 66 moves axially from indexing position the pin 216 is disengaged from the member 217 and hence said member and the indexing mechanism is disconnected from the carrier during the reciprocation thereof. During this reciprocating movement of the carrier it will be remembered that one of the lugs 207 has moved within the guideway 212 thus maintaining the pin 216 in alignment with the opening in the indexing member 217 so that when the carrier is returned to its most right hand and indexing position said pin will reenter the opening and the indexing member and mechanism will then be connected to the carrier at which time the lug 207 will have moved out of the guideway 212 and the carrier will be free to be indexed. The parts are so proportioned that the lug 207 will enter the guideway 212 before the pin 216 has completely left the opening in the indexing member 217 and conversely the pin 216 will have entered the opening in the indexing member before the lug 207 has completely left the guideway 212. This insures that the carrier is at all times held against rotation due to any unbalanced condition because of the tools mounted on the portion 67, it being remembered that the cams 221 and 222 cooperate with the cam followers to lock the indexing member 217 against rotation because of any unbalanced condition in the weight distribution of the carrier.

The shaft 223 which carries the indexing cams 221 and 222 is driven by a gear 224 keyed to said shaft (see Figs. 12 and 13) and which gear in turn is driven by a gear 225 formed on one end of a sleeve 226 freely rotatable on the shaft 227 of the constant speed non-reversible indexing motor 228. The other end of the sleeve 226 is provided with an internal gear 229 forming part of a gear reduction between the shaft 227 and the sleeve 226. The internal gear 229 constantly meshes with one or more planetary pinions 230 fixed on rotatable stub shafts 231 carried by the stationary housing of the motor 228. The pinion or pinions 230 in turn constantly mesh with a central gear 232 fixed on the shaft 227 of the indexing motor. It will be seen that energization of said indexing motor drives the sleeve 226 through the planetary reduction unit and hence the gear 225 on said sleeve drives the gear 224 on the cam carrying shaft 223 to effect indexing rotation of said shaft and cams. The end of the indexing motor shaft 227 opposite to the end carrying the sleeve 226 is extended and has fixed thereto a collar 233 similar to the collar 186 on the shaft 180 of the rapid traverse motor 181. This collar 233 is provided with pins similar to the pins 187 and extending into openings in disks 234 and 235 similar to the disks 188 and 189. The disks are held in engagement with the brake housing 236 which carries the index brake coil IB, it being understood that when said coil is energized the rotation of the disks and motor shaft 227 will be braked as already explained in connection with the braking of the rapid traverse motor. The means for braking the indexing motor will be hereinafter referred to as the index brake and the control for energizing and deenergizing the coil IB will be hereinafter explained. It will be understood that the indexing brake is released at the start of and during the indexing operation and is applied at all other times.

*Drive to cross slides*

The front and rear cross slides are actuated by mechanism now to be described and which in turn is driven from the feed transmission shown in Fig. 7 and previously explained, it being recalled that the gear 184 on shaft 183 meshes with gear 185 which has fixed thereto the cross slide actuating cam 237 (see Figs. 18 and 19, Sheets 9 and 10). The gear 185 and cam 237 are rotatable on a shaft 237a supported in the bed.

The construction and function of the cross slide actuating cam and the manner in which it is connected to operate either the front or rear cross slide or both is fully disclosed and described in the copending application of Myron S. Curtis and Harry Schoepe, Serial No. 695,732, filed September 9, 1946, now Patent No. 2,542,399, granted February 20, 1951, and reference to said application is made herein.

Each cross slide is provided with a recess 238, with the recess in the front cross slide 70 receiving the upper end of the arm 239 of a movement transmitting element or lever 240 which is rockable on a shaft 241 mounted in the bed. The lever 240 has a downwardly extending arm 242 below the shaft 241 and the lower end of said arm is provided with an elongated boss 243 having a bore therethrough. The recess 238 in the rear cross slide 71 receives the upper end of the arm 244 of the lever 245 that is rockable on a shaft 246 mounted in the bed and extending parallel to the shaft 241 but spaced rearwardly of the bed therefrom. The lever 245 also has below the shaft 246 a downwardly extending arm 247 provided at its lower end with an elongated boss 248 having a bore therethrough. The bosses 243 and 248 of the levers 240 and 245 each slidably mounts a pin 249 and said pins are adapted to be selectively engaged with either a cam groove 251 or a cam groove 252 formed in the adjacent face of the cam 237.

The pins 249 are held in either an active or an inactive position by means of a spring point 250 adapted to cooperate with spaced grooves 250a and 250b formed in the pins 249. The pins 249 are moved from their inactive position to their active position by means of lever arms 253 contacting the outer ends of the pins, the right hand ends as viewed in Fig. 18, and fixed to shafts 254 that are rockably supported in the bed and have fixed thereto lever arms 255 (see Fig. 22, Sheet 10). The shafts 254 are carried by cross bars 256 and said cross bars 256 are provided with openings or recesses 257 into which the lever arms 253 extend and with which openings the pins 249 register when the cross slides associated therewith are in their most outward positions. At this time it will be noted that the pins 249 lock the levers 240 and 245 and thus prevent accidental movement of the cross slides 70 and 71 from their most outward position.

When the shafts 254 are rocked to cause the lever arms 253 to move the pins 249 to active position and in the cam grooves 251 or 252, then the rotation of the cross slide actuating cam 237 will rock the levers 240 and 245 and as soon as the pins 249 have moved out of registry with the localized openings 257 the adjacent face of the cross bar 256 functions to hold the pins in their active position and in the cam grooves 251 and 252.

The lever arms 255 secured to the shafts 254 have their outer ends forked to straddle rods 258 which are extensions of the armatures of solenoids FCS for the front cross slide and RCS for the rear cross slide (see Fig. 22).

The rods 258 carry below the forked ends of the levers 255 slidable heads 259 which are pressed into contact with the lower edge of the levers by springs 260. It will be seen that when the solenoids FCS and RCS are energized the rods 258 move upwardly whereupon the heads 259 rock the levers 255, shafts 254 and lever arms 253 to move the pins 249 from inactive to active position. If for some reason the pins 249 cannot move from inactive to active position the solenoids will not be burned out when energized since the heads 259 will simply act to compress the springs 260 even though the lever arms 255 cannot move.

It will be understood that the solenoids FCS and RCS may be selectively energized or simultaneously energized as desired by control mechanism later to be explained. The pins 249 are moved from active position into inactive position by means of inclined blocks 261 secured at the inner ends of the cam grooves 251 and 252, see Figs. 20 and 21. As will later be explained, the pins 249 can be moved from inactive to active position wherein they engage in either the groove 251 or 252 only when the pins register with those portions of said grooves which are adjacent to the inclined blocks 261 and which are formed on a radius concentric to the shaft 237a for a purpose which will later become apparent.

It will be seen that each cam groove 251 and 252 includes a concentric portion extending from the inner end of the groove to the point $a$, an eccentric portion extending from the point $a$ to the point $b$ and a second concentric portion extending from the point $b$ to the outer end of the groove, with the latter concentric portion providing a dwell for the cross slides.

*Mechanically operated control switches*

Figure 4:
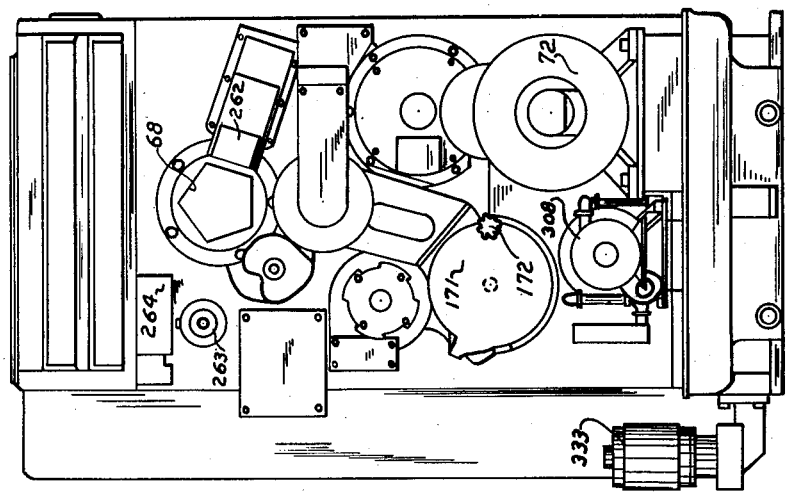
Fig. 4 is an end elevational view thereof looking from the right hand side of Fig. 3 or the left hand side of Fig. 1.
Figure 3:
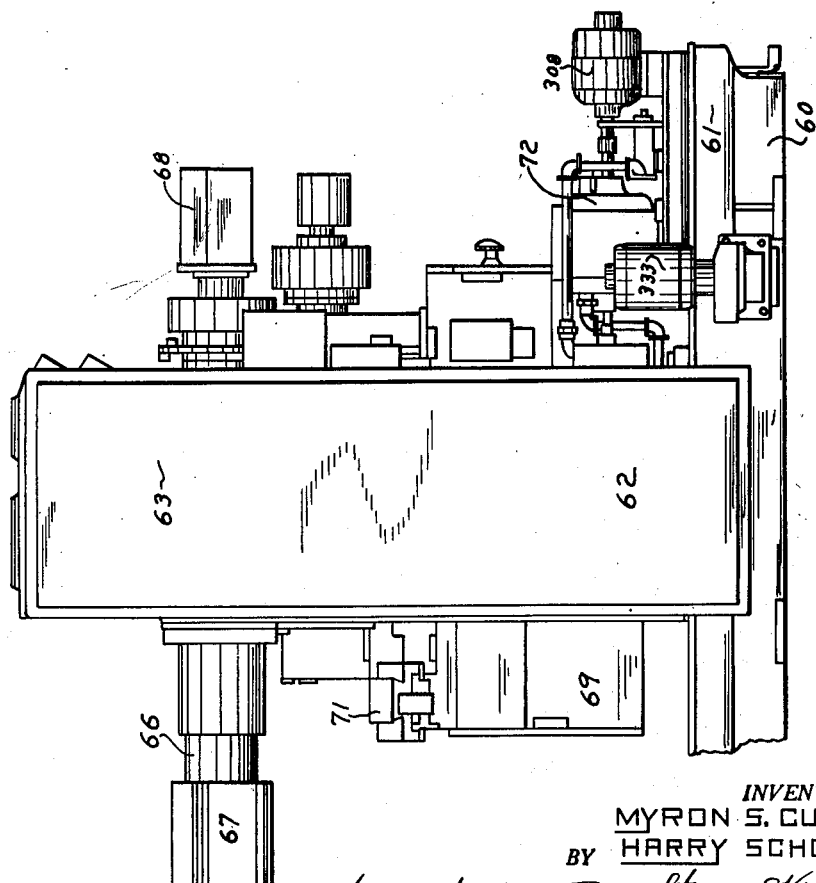
Fig. 3 is a rear elevational view of the machine tool.

Referring to Fig. 23 which is a fragmentary enlarged view similar to Fig. 4, it will be seen that the control turret 68 on the carrier 66 is operatively associated with a switch box housing 262 mounted on the end of the headstock and housing a switch box containing switches later to be referred to and actuated by adjustable dogs 263 mounted on the various faces of the control turret 68.

The end of the headstock is also provided with a switch box 264 in which are mounted seven switches, namely, CDLS1, CDLS2, CDLS3, CDLS4, CDLS5, CDLS6 and CDLS7, see Fig. 25, Sheet 6. The switches just referred to and contained within the switch box 264 are each double throw switches and include a set of normally open contacts and a set of normally closed contacts, with the normally open contacts being indicated by the letter B and the normally closed contacts by the letter A in the wiring diagram hereinafter to be described. The function or purpose of the switches just referred to will be pointed out in the explanation of the wiring diagrams.

The switch box 264 on its underside has a series of rockable arms 265, each arm being pivotally supported intermediate its ends and provided on its upper edge with an upwardly extending pin 266 arranged to actuate the switch button of one of the switches in the switch box.

There are seven arms 265 for the seven switches in the switch box and the pins 266 which actuate switches CDLS1, CDLS3, CDLS6, and CDLS7 are on the left hand side of the point of pivotal connection of the arms as viewed in Fig. 23, while the pins 266 which actuate the switches CDLS2, CDLS4 and CDLS5 are on the right hand side of the pivotal connection of the arms.

Each arm of the series of seven arms has its opposite ends located in guide grooves 267 formed on the lower side of the switch box, as clearly shown in Figs. 23 and 25. Also each arm fixedly carries a pin 268 which extends below the switch box and is provided on its lower end with a rounded head. Each pin 268 above the upper edge of the arm which carries it has mounted thereon a spring 269 which functions to maintain the left hand end of the arm in a downwardly rocked position as indicated in Fig. 23. The pins 268 cooperate with cam lugs formed on a series of cam rings now to be explained.

It will be recalled by reference to Fig. 12, Sheet 6, that gear 201 fixed to gear 197 which drives the actuating cam drum 198 drives in turn a gear 202 fixed on a cam ring control drum shaft 203.

Referring to Fig. 24, Sheet 12, the cam ring control drum carried by said shaft 203 is indicated at 270 and said drum mounts on its circumference a wide cam ring 271 and three narrow cam rings 272, 273 and 274 respectively. The wide ring 271 is provided with four circumferentially displaced cam lugs 271a, 271b, 271c and 271d, said lugs being correlated, respectively, to the switches CDLS1, CDLS2, CDLS3 and CDLS4 and adapted as the cam ring control drum 270 and ring 271 rotate to engage the respective pins 268 to rock the arms 265 related to said switches to actuate the latter in a desired manner.

The wide cam ring 271 is mounted on the drum 270 in one fixed position by means of a key 275, since it is not desired to vary the operative timing of the actuation of the switches related to this ring. The narrow cam ring 272 is provided on its circumference with a cam lug 272a which operates on the pin 268 carried by the arm 265 that actuates switch CDLS6. The ring 272 is provided internally with a key-way 276 slightly wider than the key 275, wherefore the ring 272 can have slight angular adjustment relative to the key 275 to vary the point of actuation of the switch CDLS6 and in turn the dwell period for the carrier and the cross slides after "Late" cross slide operation and before initiating the rapid traverse return movement thereof.

The cam ring 273 is provided on its circumference with a cam lug 273a which actuates the arm 265 for actuating the switch CDLS5. The ring 273 is provided interiorly with a key-way 277 that is slightly wider than the key 275 to provide for slight angular adjustment of the ring to vary the point of the actuation of the switch CDLS5 to vary the dwell after "Early" cross slide feeding movement before initiation of the rapid traverse return of the cross slide and carrier.

The cam ring 274 is provided on its circumference with a wide cam lug 274a which effects actuation of the switch CDLS7. This ring 274 internally has a wide key-way 278 providing a wide range of angular adjustment of the ring, since the switch CDLS7 controls the change from rapid traverse to feeding movement for the cross slides during the "Late" operation of the cross slides.

The rings 271, 272, 273 and 274 are slipped over the control drum 270 with the key 275 located in the keyways of the rings and then when the three narrow rings have been properly adjusted the rings are clamped in position between a clamping plate 279 secured to the end of the drum by suitable means such as screws and a flange formed on the opposite end of the drum as clearly shown in Fig. 24.

The cam lugs on the rings are shown in Fig. 24 out of normal position in order to illustrate the entire seven cam lugs. It will be observed that since the shaft 203 is geared to the actuating cam drum 198, said shaft and the control drum 270 will always be rotated in the same timed relationship with the rotation of the cam drum and hence the cam lugs on the rings 271, 272, 273 and 274 will always actuate the respective switches at the same time in the operative cycle with the exception of the adjustments that can be given to the three narrow rings 272, 273 and 274.

Referring to the diagram of Fig. 44, point A represents the beginning of the forward movement of the carrier, such movement being indicated by the line designated AB (rapid traverse forward and feed). The point B is that at which the lug 271a of the ring 271 actuates switch CDLS1 to terminate the feeding movement and to initiate rapid traverse return if no dwell is desired.

The line BC represents the normal dwell after the termination of the feeding movement and before the commencement of the rapid return movement, it being understood that said period can be varied slightly by adjusting the position of the ring 273, the lug 273a of which actuates switch CDLS5 to initiate the rapid return movement.

The line CA represents the rapid return movement of the carrier and when point A is reached lug 271d on the ring 271 actuates switch CDLS4 to deenergize rapid traverse motor 181 and energize indexing motor 228.

The portion of the diagram of Fig. 44 now to be described represents the operation of the cross slides for normal or "Early" operation, that is, an operation wherein the cross slides will end their cutting movement simultaneously with the termination of the similar movement of the carrier.

The line DE represents the concentric portions of the cam grooves 251 and 252 of the cross slide actuating cam 237 at the inner end thereof (the entering end) and it is during the time that the pins 249 are entering said portion of the grooves that the lug 271b on the ring 271 actuates switch CDLS2 to start the forward movement of the selected cross slide or slides, the manner in which the slide movements are selected to be explained hereinafter when the index control drum is described in detail.

The line EF represents the forward movement of the cross slide or slides, it being understood that when the point F is reached the switch CDLS1 is actuated, as previously explained, to terminate the forward feeding movement and if no dwell is desired to initiate the rapid return movement. However, if a dwell is desired then the switch CDLS5 is actuated to provide the desired dwell as already explained.

The line FD represents the rapid return movement of the cross slide or slides, while the line FD' represents the outer concentric portions of the cam grooves 251 and 252, that is, the "dwell" period.

The diagram of Fig. 44 as applicable to the "Late" operation of the cross slide or slides will now be explained. In the "Late" operation of the cross slide or slides the carrier has moved to its most forward position at rapid traverse without feed and then, while the carrier is in dwell, the cross slide or slides are moved forwardly to actuate a movable "pusher" tool carried by the carrier.

The line GH of the diagram represents the engagement of the pin or pins 249 in the inner concentric portions of the cam grooves 251 and 252 (this is 180° later than line DE) during which time the carrier is in rapid traverse and the lug 271c of the ring 271 actuates the switch CDLS3 to insert the pins 249 and initiate the forward travel of the cross slide or slides which commences at the point H.

The cam follower 211 is in the dwell portion 200a of the cam groove 200 of the cam drum 198. At this time actuation of switches CDLS1 or CDLS5 have no effect on the circuit and the carrier remains in its forward position due to the adjustment of the ring 274 for "Late" operation of the cross slide or slides and the pin inserted in the index drum to operate limit switch ILS2 for this face.

The line HI represents the forward movement of the cross slide or slides during "Late" cross slide operation and this is the time when the pins 249 are in the eccentric portions of the cam grooves. The ring 274 having been adjusted for "Late" operation the lug 274a will actuate the switch CDLS7 during the forward movement of the cross slide or slides and this actuation of said switch terminates rapid traverse thereof and initiates the feeding movement of the cross slide or slides to actuate the "pusher" tool on the now stationary carrier. At the end of the feeding movement of the cross slide or slides, i. e., point I, the lug 272a on the ring 272 actuates switch CDLS6 to start the rapid return movement of the carrier and cross slides. Since the ring 272 can be given angular adjustment on the control drum a dwell period can be provided if desired before the switch CDLS6 is actuated.

The dash line IG represents the rapid return of the cross slide or slides. After this time the carrier is traveling in rapid return as represented by the line BA.

The index member 217, as already explained, is provided with a cylindrical or sleeve portion 280 which will be designated herein as the index control drum. This drum is provided with a plurality of axially spaced series of circumferentially spaced openings 281 to receive pins or dogs 282, see Fig. 36. Each series of circumferentially spaced openings 281 contains openings corresponding in number to the tool faces on the tool carrier and, as illustrated, there are six axially spaced series of openings. In addition the index control drum 280 slidably mounts an elongated pin 283 which is actuated, as will later be explained, to terminate the work cycle. The pins 282 and the elongated pin 283 on the index control drum 280 engage headed pins 284 to rock lever arms 285 substantially identical with the lever arms 265 previously described and arranged in a series of seven arms pivotally supported on the exterior of a switch box 286 contained in the housing 262. Each lever arm 285 is provided with a pin 287 for actuating the switch button of a respective switch with the pins 287 of four of the lever arms being located on one side of the pivot of said arms and the pins 287 of three of the arms located on the opposite sides of the pivot of said arms. The lever arms 285 which are rocked by the pins or dogs 282 actuate switches ILS2, ILS5, ILS4, ILS3, ILS6 and ILS7 mounted in the switch box 286 while the lever arm which is rocked by the elongated pin 283 actuates switch ILS1 also mounted in said box. The switches just referred to are double throw switches, with one set of contacts normally closed and the other set thereof normally open. The normally closed contacts of these switches are designated in the wiring diagram later to be described by the letter A, while the normally open contacts thereof are designated by the letter B.

The control turret 68 previously referred to and mounted on the end of the carrier 66 is of polygonal configuration and is shown as having five sides or faces, on one of which and adjacent to the pin carrying flange 215 there is secured a cam dog 288 for operating the slidable elongated pin 283 at the end of the work cycle to actuate switch ILS1 to end the work cycle.

Each face of the control turret 68 is provided with a plurality of spaced parallel axially extending slots 289, reference to Figs. 36 and 39 indicating that each face contains six of such slots. The slots 289 adjustably mount pins or dogs 263 which function during the axial reciprocation of the drum 68 with the carrier to move pins 291 carried by rockable arms 292 similar to the arms 285 and 265 previously described.

The arms 292 are six in number and each carries on its underside a pin 293 arranged when the arm is rocked to actuate the switch button of a related switch. The arms 292 actuate the six switches TLS1, TLS2, TLS3, TLS4, TLS5 and TLS6 mounted within switch box 294 in the housing 262. The pins 293 of the arms 292 that actuate the switches TLS1, TLS3 and TLS5 are located to the left of the pivotal mounting of the respective arms, while the pins 293 of the arms which actuate the switches TLS2, TLS4 and TLS6 are located to the right thereof as viewed in Figs. 37 and 39.

The switches in the switch box 294 control the spindle speeds and the feed rates and are each of the double throw type, with the normally closed contacts thereof indicated in the wiring diagram by the letter A and the normally open contacts thereof by the letter B.

*Control of pressure fluid clutches in spindle drive train*

It will be recalled that there are two pressure fluid clutches on the shaft 73 for clutching either the gear 74 or the gear 76 to said shaft, see Fig. 5, namely, clutches C2 and C1. It will also be recalled that there are two pressure fluid clutches on the shafts 99 and 103 for connecting said shafts or for connecting the gear 102 to the shaft 103, namely, clutches C3 and C4.

It will be recalled that pressure fluid for the clutch C1 is supplied to the passage 85 while pressure fluid for the clutch C2 is supplied to the passage 84. The passages 85 and 84 are connected, respectively, to passages 295 and 296 formed in a valve block 297 and communicating with a valve chamber 298 (see Figs. 40 to 43 inclusive, Sheet 8). The passages 112 and 113 which supply pressure fluid to the clutches C3 and C4 are connected, respectively, to passages 299 and 300 formed in the valve block 297 and communicating with a valve chamber 301 in said block. The valve chamber 298 is connected by a passage 302 with an intermediate valve chamber 303 while the valve chamber 301 is connected to said intermediate valve chamber 303 by a passage 304.

The valve chambers 301 and 303 are connected by passages 305 and 306 to a supply line 307 that extends to the output side of a pump 308. The input side of the pump 308 is connected by line 309 to the reservoir 310 for a supply of suitable liquid such as oil. The upper ends of the valve chambers 298 and 303 are connected by passages 311 and 312, respectively, with the return or drain line 313 that extends to the reservoir 310. The lower ends of the valve chambers 298, 301 and 303 are connected by return line 313a to the line 313. Each valve chamber slidably supports a reciprocating valve formed of two spaced valve heads which cooperate with the lands in the valve chambers to connect the various passages in the valve block 297 in the manner shortly to be explained.

The valve bodies are connected to extensions of the armatures of solenoids SVA, SVB and SVC and when said solenoids are deenergized the bodies are normally held in the positions within the valve chambers indicated in Fig. 40, it being noted that each extension of the armature of each solenoid carries a coil spring 314 acting upon deenergization of the solenoid to move the valve body to its normal position.

In Fig. 40 as already stated the three solenoids are deenergized and the valve bodies of the three valves are positioned as indicated. At this time the inlet passage 305 is connected through the valve chamber 301 with the passage 299 that extends to passage 112 and hence clutch C3 is engaged. Also at this time inlet passage 306 is connected through the valve chamber 303 with passage 304 and the latter passage is connected through the valve chamber 301 with passage 300 that is connected with passage 113 and hence clutch C4 is engaged. In addition, it will be seen that passage 295 that extends to passage 85 is connected through the valve chamber 298 with passage 302 and through the valve chamber 303 with passage 312 and thence to drain or reservoir 310. Therefore at this time clutch C1 is disengaged and is connected to drain. Also at this time passage 296 which extends from passage 84 is connected through valve chamber 298 with passage 311 that is connected to the return or drain line 313 and hence at this time clutch C2 is disengaged and is connected to drain. This is the position of the three valves when the spindle is braked, since disengagement of the clutches C1 and C2 and simultaneous engagement of the clutches C3 and C4 imparts a braking action to the shaft 103 and to the spindle 64 through the gearing connecting said shaft with the spindle.

As already stated, four different speeds can be imparted to the shaft 103 through selective engagement and disengagement of the clutches C1, C2, C3 and C4 in order to impart four different speeds to the spindle in either the "High" speed range or the "Low" speed range.

Fig. 41 represents the position of the valves by the selective energization of certain of the solenoids to obtain spindle speed #1, at which time clutches C1 and C3 are engaged while clutches C2 and C4 are disengaged. It will be noted that in Fig. 41 the solenoids SVB and SVA are deenergized while solenoid SVC is energized. Therefore inlet passage 306 is connected through the valve chamber 303 with passage 302 and the latter is connected through the valve chamber 298 with passage 295 and pressure fluid is being supplied to clutch C1 to engage the latter. Also at this time inlet passage 305 is connected through valve chamber 301 with passage 299 that is connected to clutch C3 and hence pressure fluid is being supplied to said clutch to engage the same. Passage 296 which is connected with clutch C2 is connected through valve chamber 298 with passage 311 that is connected with drain line 313 and hence clutch C2 is disengaged and connected to drain. Passage 300 that is connected to clutch C4 is connected through valve chamber 301 with passage 304 extending to valve chamber 303 and since the valve body in this chamber has been shifted by energization of solenoid SVC the passage 304 is connected with the return line 313a. Therefore at this time clutch C4 is disengaged.

In Fig. 42 the three valves are shown in the relationship they have to obtain spindle speed No. 3 and at this time solenoids SVB and SVC are energized while solenoid SVA is deenergized. It will be seen that inlet passage 306 in the valve block is connected through valve chamber 303 with passage 302 and the latter through valve chamber 298 with passage 295 and hence pressure fluid is being supplied to clutch C1 and the latter is engaged. Also at this time inlet passage 305 in the valve block is connected through valve chamber 301 with passage 300 and pressure fluid is being supplied to clutch C4 and the latter is engaged. The passage 296 connected to clutch C2 is connected through valve chamber 298, passage 311 and return line 313 with drain and hence clutch C2 is disengaged. Passage 299 connected with clutch C3 is connected through valve chamber 301 with drain line 313a and hence said clutch C3 is disengaged.

Fig. 43 illustrates the positions of the three valves for spindle speed No. 4. At this time all three solenoids are energized and passage 296 connected to clutch C2 is connected through the valve chamber 298 with passage 302 and through valve chamber 303 with inlet passage 306 and hence pressure fluid is being supplied to clutch C2 to engage the latter. In addition, inlet passage 305 in the valve block 297 is connected through valve chamber 301 with passage 300 that is connected to the clutch C4 and hence the latter clutch is engaged. The passage 295 in the valve block which is connected to clutch C1 is connected through the valve chamber 298 with drain line 313a and hence said clutch C1 is disengaged. Passage 299 in the block 297 and which is connected to clutch C3 is connected to the drain line 313a through valve chamber 301 and hence said clutch C3 is disengaged.

The position of the three valves for spindle speed No. 2 have not been illustrated but it will be understood that for such speed clutches C2 and C3 will be engaged while clutches C1 and C4 will be disengaged. Also at this time solenoids SVA and SVC will be energized while solenoid SVB is deenergized. Therefore passage 296 connected to clutch C2 will be connected through valve chamber 298 with passage 302 and through valve chamber 303 with inlet passage 306 and pressure fluid will be supplied to clutch C2 to engage the latter. In addition inlet passage 305 will be connected through valve chamber 301 with passage 299 that is connected with clutch C3 and hence pressure fluid is supplied to this clutch to engage the same. During spindle speed No. 2 passage 295 connected to clutch C1 is connected through valve chamber 298 with return line 313a and hence said clutch is draining and is disengaged. Likewise passage 300 connected to clutch C4 is connected through valve chamber 301 with passage 304 and through valve chamber 303 with return line 313a and hence said clutch C4 is draining and is disengaged. The control for the energization and deenergization of the solenoids SVA, SVB and SVC will be set forth hereinafter.

*Operator's control panel*

An operator's control panel 314 is mounted on the front side of the headstock 63 and has the actuating buttons or knobs for various switches as will now be explained. The panel 314 mounts the start and stop push buttons 315 and 316 which control the starting and stopping of the main motor. The panel in addition mounts the cycle start push button 317 for starting the automatic cycle of operation of the machine and in addition push buttons 318, 319 and 320 for effecting hand control of rapid traverse forward, rapid traverse return and indexing respectively. A control knob or handle 321 is provided on the panel for actuating the switch which controls the operation of the coolant pump and said knob may be moved to any one of three different positions, namely, an "Off," "On" and "Intermittent." The coolant pump control switch is a double contact switch and reference to Fig. 46 will show that when the knob 321 is in the "Off" position both contacts C-1 and C-2 of said switch are open, but when it is in the "On" position then contact C-2 is closed and contact C-1 is opened, while when it is in the "Intermittent" position contact C-1 is closed and contact C-2 is opened. The panel 314 also mounts control handle or knob 322 for actuating the spindle control switch and said knob can be turned to any one of three positions, namely, "run," "off" or "jog." The spindle control switch is a three-contact switch and in the "run" position contacts MS-1 and MS-2 are opened and contact MS-3 is closed (see Fig. 48). In the "Off" position of this switch contact MS-1 is closed and contacts MS-2 and MS-3 are opened. In the "jog" position of this switch contacts MS-1 and MS-3 are open while contact MS-2 is closed.

The panel 314 also mounts the control handle or knob 323 for actuating the hand feed control switch and said knob may be moved to either an "Off" or an "On" position. The hand feed control switch is a three contact switch and reference to the chart of Fig. 49 indicates that in the "Off" position of the knob 323 contact HF-1 and contact HF-2 are closed while contact HF-3 is opened. In the "On" position of the knob 323 contact HF-3 is closed while contacts HF-1 and HF-2 are opened.

The control panel 314 contains another knob or handle 324 which may be turned to any one of three different positions for actuating the three contact hand feed selector switch. In position 1 of this switch contact FS-1 is closed while contacts FS-2 and FS-3 are opened. In position 2 contact FS-2 is closed while the other two contacts are open and in position 3 contact FS-3 is closed while the other two contacts are open, as reference to the chart of Fig. 50 will clearly indicate. It will be understood that the three positions of the knob 324 and the three actuated positions of the hand feed selector switch provide for the obtainment of the three different feeding rates of which the machine is capable and which have been pointed out hereinbefore.

The control panel 314 also has a control handle or knob 325 which can be moved to either of two positions, namely, "Hand" or "Automatic" to actuate the machine control switch.

Figure 47:
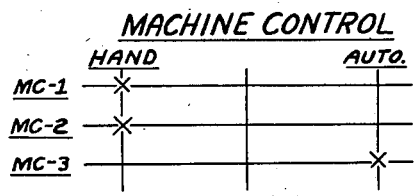
Figure 50:
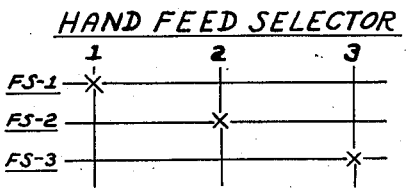
Figure 48:
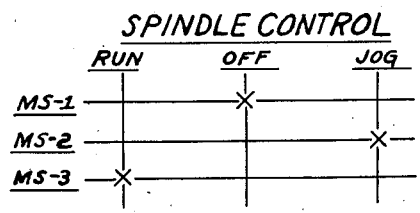

Referring to the chart of Fig. 47, it will be noted that machine control switch is a three-contact switch and in the "Hand" position contacts MC-1 and MC-2 are closed while the other contact is open. In the "Automatic" position contacts MC-1 and MC-2 are open and contact MC-3 is closed.

The control panel 314 further mounts a control knob or handle 326 which can be moved to any one of four positions to actuate the hand spindle speed selector switch to obtain any one of the four spindle speeds in either the "High" or "Low" speed ranges which have been previously referred to.

Figure 51:
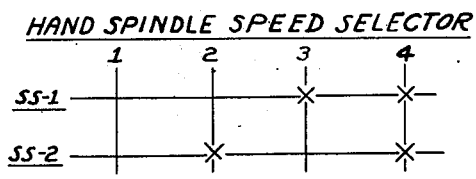

In the chart of this switch shown in Fig. 51 it will be seen that the switch is a two-contact switch and in position 1 of the knob 326 both contacts thereof are open. In position 2 contact SS-1 is open and contact SS-2 is closed while the reverse obtains for position 3. In position 4 both contacts are closed.

*Power and control circuits*

The power circuit for the motors and the control circuit therefor will now be explained with reference to the diagrams of Figs. 52, 53, 54 and 55, Sheets 15 to 18 inclusive.

Referring first to Fig. 52, the power circuit comprises the lines 327, 328 and 329 in which is a circuit breaker CB. The non-reversible constant speed main motor 72 is connected to the power lines by the three lines 330, 331 and 332 in which are the normally open contacts MM-3, MM-4 and MM-5. The coolant pump motor 333 is connected to the power line by the three wires 334, 335 and 336 and the normally open contacts CM-1, CM-2 and CM-3 are in these wires. The non-reversible constant speed index motor 228 is connected to the power line by wires 337, 338 and 339 in which are the normally open contacts IM-1, IM-2 and IM-3. The constant speed reversible rapid traverse motor 181 is connected to the power line for forward operation by the three wires 340, 341 and 342 which contain the normally open contacts RTF-1, RTF-2 and RTF-3. For reverse operation of the rapid traverse motor 181 the wire 340 is connected to wire 342 by wire 343 containing normally open contact RTR-4. In addition the wire 344 connected to the wire 341 places normally open contact RTF-2 in wire 341 in parallel with normally open contact RTR-5 in wire 344. The wire 342 is connected to wire 340 by wire 345 containing normally open contact RTR-6.

The power lines 327 and 329 are connected by lines 346 and 347 to the primaries of the rectifier transformer RT and the control transformer CT, it being noted that the wire 348 extending from the wire 347 to the rectifier transformer RT contains the normally open contact MM-1. The opposite ends of the secondary of the rectifier transformer are connected to the plates of rectifier tube R. The center tap of the secondary of the rectifier transformer is connected to wire 349 which forms one side of the control circuit. The wire 349 is also connected to one end of the secondary of the control transformer CT. The filament or heater of the rectifier tube R is connected by wires 350 and 351 to the filament winding of the secondary of the control transformer and the middle tap of this winding is connected to wire 352 forming with the wire 349 the D. C. control circuit. The other winding of the secondary of the control transformer is connected to wire 353 forming with wire 349 the A. C. control circuit.

Now referring to Fig. 53, it will be seen that wires 353 and 349 of the A. C. control circuit are connected by wire 354 which contains the normally closed push button "stop" switch, the normally open push button "start" switch, normally open contacts MS-1 and main motor contactor coil MM. Wire 355 connected to wire 354 places normally open contact MM-2 in parallel with the normally open push button "start" switch and normally open contacts MS-1 and functions to establish a holding circuit around the same. The wire 354 is connected to wire 353a containing normally open push button "start" switch and normally open air pressure switch contact AP and forming with wire 349 a continuation of the A. C. control circuit.

The wires 352 and 349 of the D. C. control circuit are connected by wires 356, 357, 358, 359 and 360. The wire 356 contains resistor 361; normally closed contacts RTFR–1, RTRR–1, 1FR1, 2FR1 and 3FR1. In addition wire 356 contains the rapid traverse brake coil RB. Wire 357 contains resistor 362, normally closed contact I1 and the brake coil IB for the index motor. The wire 358 contains resistor 363, normally open contact 1FR2 and the coil of the magnetic feed clutch F1 on shaft 157, Fig. 7, which provides the No. 1 feeding rate. The wire 359 contains resistor 364, normally open contact 2FR–2 and the coil of magnetic clutch F2 on shaft 157 which provides for the No. 2 feeding rate. The wire 360 contains resistor 365, normally open contact 3FR–2 and the coil of magnetic clutch F3 on shaft 157 which provides the No. 3 feeding rate.

Reverting again to the A. C. control circuit and still referring to Fig. 53, the wires 353a and 349 of said circuit are connected by wire 366 which contains normally open contacts MS–2, HUV–1 and C–2 and the coolant motor contactor coil CM. The wire 367 connecting wires 353a and 366 contains normally open contact C–1 which is in parallel with the three normally open contacts in wire 366. The wire 366 is also connected to wire 353a by wire 368 which contains normally open contact MS–3 in parallel with normally open contact MS–2 in wire 366. The wires 353a and 349 are interconnected by wire 369 containing normally open contacts UV–1, 1FR–3, FDLS and solenoid operated valve coil SVC. Normally open contacts IR–3, 2FR–3, 3FR–3, RTFR–2, RTRR–2 and I–2 between the wires 370 and 371 are in parallel with normally open contact 1FR–3 in wire 369. The wire 371 is connected to wire 366 while the wires 353a and 349 of the A. C. control circuit are interconnected by wires 372 and 373 containing respectively, normally open contact 1SR–1 and solenoid operated valve coil SVB and normally open contact 2SR–1 and solenoid operated valve coil SVA.

Continuing the description of the diagram of the A. C. control circuit and with particular reference to Fig. 54, the wires 353a and 349 are connected by wire 374 containing normally open contacts TLS1–B and UV–2, normally closed contact RTRR–3 and spindle relay SR. The wire 375 also interconnects the wires 353a and 349 and contains the normally open contacts TLS2–B, SR–2 and UV–3 and the spindle relay 1SR. The wire 376 connected to wires 353a and 375 contains normally open contacts 1SR–2 and SR–1 in parallel with the contacts TLS2–B and SR–2 in wire 375. The wire 377 connects wires 353a and 375 and contains normally open contacts SS–1 and HUV–2 in parallel with the three normally open contacts in wire 375. The wires 353a and 349 are interconnected by wire 378 containing normally open contacts TLS3–B, SR–4 and UV–4 and spindle relay 2SR. Wire 379 interconnects wires 353a and 378 and contains normally open contact 2SR–2 and normally closed contact SR–3 in parallel with contacts TLS3–B and SR–4 in wire 378. The wire 380 interconnects wires 353a and 378 and contains normally open contacts SS–2 and HUV–3 in parallel with the three contacts in wire 378. The wire 381 interconnects wires 353a and 349 and contains normally closed contacts ILS5–A, IR–1 and UV–5 and skip index relay IR. Normally open contact RTRR–4 in wire 382 is in parallel with contacts ILS5–A and IR–1 in wire 381. The wire 383 interconnects wires 353a and 349 and contains normally open contacts CDLS4–B, HUV–4, normally open push button actuated hand index switch HI and index relay I. Wire 384 is connected to wire 383 intermediate normally open contact CDLS4–B and switch HI and which in turn is connected to wire 385 which interconnects wires 353a and 349. The wire 384 is connected to wire 349 by wire 386 which contains normally open contacts I–3 and I–4 and normally closed contact GLS1–A and also contactor coil IM for the index motor. The contacts in wire 386 are in parallel with switch HI and contact HUV–4 in wire 383. Wire 384 is connected to wires 383 and 386 by wire 387 containing normally open contact IR–2 which is in parallel with the contacts in wires 383 and 386. The wire 384 contains normally closed contact HUV–5 and normally closed contact UV–6 and is connected to wire 385 intermediate normally open contacts HUV–6 and GLS1–B, with said wire 385 containing also normally open contact MC–2, normally closed contact UV–8 and hand under voltage relay HUV. The wire 388 connected to wires 353a and 385 contains normally open contact UV–7 in parallel with contact HUV–6 in wire 385. The wire 389 is connected to wire 386 intermediate contacts I–3 and GLS1–A and is also connected to wire 385 intermediate contacts GLS1–B and MC–2. The wire 389 is connected to wire 349 by wire 390 containing normally open contact MC–3, normally closed contact HUV–7 and under voltage relay UV. The wire 389 is also connected to wire 349 by wire 391 containing normally open contact ILS2–B and "Late" cross slide relay LCS and is further connected to wire 349 by wire 392 containing normally open contacts RTRR–5 and UV–9, normally closed contact CDLS4–A and a rapid traverse return contactor coil RTR. The wire 393 interconnecting wires 392 and 349 contains rapid traverse return relay RTRR in parallel with contactor coil RTR. The wire 392 is interconnected with wire 353a intermediate contacts UV–9 and CDLS4–A by wire 394 containing normally open contacts MC–1 and HF–1 and normally open push button actuated rapid traverse return switch RTR. Wire 395 is connected to wire 392 intermediate contacts RTRR–5 and UV–9 and said wire 395 and wire 389 are interconnected by wires 396 containing normally open contact CDLS6–B and wire 397 containing normally closed contacts LCS–1, ILS6–A and normally open contact CDLS1–B, the contacts in wires 396 and 397 being in parallel with contact RTRR–5 in wire 391. Wire 397 is connected to wire 349 by wire 398 containing normally open contacts CDLS2–B and ILS3–B, normally closed contact RTRR–6 and front cross slide solenoid FCS. Wire 398 is connected to wire 395 by wire 399 (see Fig. 55, Sheet 18) containing normally open contact CDLS5–B in parallel with contacts ILS6–A and CDLS1–B in wire 397. Wire 400 interconnecting wires 398 and 349 contains normally open contact ILS4–B and rear cross slide solenoid RCS in parallel with normally open contact ILS3–B and front cross slide solenoid FCS in wire 398. The wire 389 is connected to wire 401 which extends from wire 398 to wire 402 with the latter connected to wire 403 and to wire 404 extending between wires 403 and 349. The wire 401 contains normally open contacts LCS–2 and CDLS3–B located on one side of wire 389, normally open contact LCS–4 and normally closed contact CDLS6–A located on the other side of wire 389. The wire 402 contains normally open push button actuated "cycle" switch, normally closed contact CDLS7-A, normally open contact CDLS7-B and normally closed contact RTRR-7, with the wire 401 being connected to wire 402 intermediate contacts CDLS7-B and CDLS7-A. Wire 405 interconnects wires 389 and 402 and contains normally closed contacts CDLS5-A, CRLS1-A, LCS-3 and ILS6-B in parallel with contacts CDLS6-A and LCS-4 in wire 401 and also CDLS7-B in wire 402. Wire 404 contains normally closed contacts TLS4-A, TLS5-A, TLS6-A, ILS1-A in parallel with the contacts and switch in wire 402, normally open contact UV-10, normally closed contacts I-5 and IR-4, RTRR-8, 1FR-4, 2FR-4, 3FR-4 and rapid traverse forward contactor RTF. Wire 406 contains rapid traverse forward relay RTFR in parallel with rapid traverse forward contactor RTF in wire 404. Contact RTF-4 in wire 407 is in parallel with the "cycle" switch in wire 402 and with the normally closed contact ILS1-A in wire 404.

Wire 408 interconnecting wires 403 and 404 contains contacts HUV-8 and HF-2 and normally open push button operated rapid traverse forward switch RTF, all of which are in parallel with contacts TLS4-A, TLS5-A, TSL6-A, ILS1-A and UV-10 in wire 404.

Wire 409 connected to wire 408 between the two contacts therein extends to wire 410 which interconnects wires 403 and 349. Wire 409 contains normally open contacts HF-3 and FS-1 while wire 410 contains normally open contacts UV-11 and TLS4-B and No. 1 feed relay 1FR. Wire 411 interconnects wires 403 and 410 and contains normally open contacts UV-12 and 1FR-5 and normally closed contacts 2FR-5 and 3FR-5 with the said contacts in wire 411 in parallel with the contacts in wire 410. Wire 412 connected to wire 410 intermediate the normally open contacts in the latter is interconnected to wire 349 by wire 413 containing normally open contact TLS5-B and No. 2 feed relay 2FR. Wire 412 is also interconnected with wire 349 by wire 414 containing normally open contact TLS6-B and No. 3 feed relay 3FR. Wire 414 is connected to wire 409 intermediate the contacts of the latter by wire 415 containing normally open contact FS-3. Wire 413 is connected to wire 415 by wire 416 containing normally open contact FS-2. Wire 414 is connected to wire 411 by wire 417 containing normally closed contacts 1FR-7 and 2FR-7 and normally open contact 3FR-7. The wire 417 is interconnected to wire 413 by wire 418 containing normally closed contact 1FR-6, normally open contact 2FR-6 and normally closed contact 3FR-6.

*Energization of circuits*

The manner in which the machine operates with particular reference to the operation of the control circuits will now be set forth for both manual operation and automatic operation. In order to energize the power and control circuits the operator closes circuit breaker CB to energize the control circuit transformer CT that supplies power to the control circuits and to the heater of the rectifier R. He then puts the spindle control switch knob 322 in the "Off" position, thus closing contact MS-1 in wire 354, Fig. 53, after which he depresses the motor "Start" push button 315 on the operator's control panel 314 to energize main motor contactor coil MM in wire 354. Upon the contactor coil MM being energized contact MM-1 in wire 348 is closed, thus energizing rectifier transformer RT, see Fig. 52. Also contact MM-2 in wire 355, Fig. 53, is closed maintaining contactor coil MH energized after the motor "Start" push button 315 has been released. The energization of contactor coil MM also closes contacts MM-3, MM-4 and MM-5 in wires 330, 331 and 332, thus energizing the main motor 72. If the fluid pressure is above the value necessary to close the fluid pressure switch AP in wire 353a, then power is supplied to the rest of the circuit through this switch. The operator now sets the machine control switch knob 325 on the control panel 314 in the "hand" position, thus closing contacts MC-1 in wire 394 and MC-2 in wire 385, Fig. 54. He also sets the hand feed switch knob 323 in the "Off" position closing contacts HF-1 in wire 394, Fig. 54, and HF-2 in wire 408, Fig. 55. He then depresses the rapid traverse reverse push button 319, closing the contacts of switch RTR in wire 394, whereupon the carrier is caused to move rearwardly in rapid traverse until normally closed limit switch CDLS4-A is opened by lug 271d on the wide ring 271 of the cam ring control drum 270 shown in Fig. 24, whereupon the carrier is stopped in its maximum rearward or out position.

*Manual operation*

The opening of the A contacts in the two-position limit switch CDLS4 in wire 392 closes the normally open contacts B thereof in wire 383 and since the machine control switch knob 325 is in "hand" position, the hand undervoltage relay HUV in wire 385 is energized through normally closed contacts HUV-5 and UV-6 in wire 384, now closed contact GLS1-B and MC-2 in wire 385 and normally closed contact UV-8 in said wire. The energization of relay HUV seals itself in by the closing of normally open contacts HUV-6 in wire 385. The energization of relay HUV also closes normally open contacts HUV-1 in wire 366, Fig. 53, HUV-2 in wire 377, HUV-3 in wire 380, HUV-4 in wire 383, HUV-8 in wire 408, and opens normally closed contact HUV-7 in wire 399, thus energizing that portion of the circuit containing the manually operated switches.

The operator now turns the hand spindle speed selector switch knob 326 on the panel 314 to the desired spindle speed which will be assumed as speed No. 3, closing contacts SS-1 in wire 377 and energizing relay 1SR in wire 375, it being recalled that contact HUV-2 is now closed. The energization of relay 1SR closes contact 1SR-1 in wire 372, thus energizing solenoid operated valve SVB, see Fig. 42. The spindle commences to rotate when the spindle control switch knob 322 is turned to either "Run" or "Jog" position to close contact MS-3 in wire 368 or contact MS-2 in wire 366, and since contact HUV-1 is now closed solenoid operated valve SVC in wire 369 is energized, it being understood that limit switch FDLS in wire 369 is closed due to the closing of the feed transmission door 171. The energization of solenoid operated valve SVC shifts its related valve body to the position shown in Fig. 42, thus disengaging clutch C3 and releasing the hydraulic spindle brake and engaging clutch C1 while clutch C4 remains engaged, whereupon the spindle rotates at speed No. 3 since clutches C1 and C4 are engaged by the energization of solenoid operated valves SVB and SVC while solenoid operated valve SVA is not energized and hence clutches C2 and C3 are disengaged.

The hand feed selector switch knob 324 is set to the feed to be used on face No. 1 of the carrier which will be assumed as feed No. 2 and therefore contact FS-2 in wire 416 is closed while contacts FS-1 in wire 409 and FS-3 in wire 415 are opened. The operator now rapid traverses the carrier to the point at which the carrier is to start feeding by depressing the "rapid traverse forward" push button 318 in wire 408 to energize the rapid traverse forward contactor coil RTF in wire 404 and relay RTFR in wire 406. When the rapid traverse switch RTF in wire 408 was closed the contactor RTF and relay RTFR were energized through normally closed contacts IFR-4, 2FR-4, 3FR-4, RTRR-8, I-5, IR-4 in wire 404 and now closed contacts HF-2, HUV-8 in wire 408 and the normally closed contacts RTRR-7 in wire 402, CDLS5-A, CDLS1-A and LCS-3 in wire 405 and now closed contacts GLS1-B and HUV-6 in wire 385. The energization of contactor coil RTF closed contacts RTF-1, RTF-2, and RTF-3 in wires 340, 341 and 342 to energize rapid traverse motor 181 for forward operation. The energization of relay RTFR opened normally closed contact RTFR-1 in wire 356 of the D. C. control circuit, thus deenergizing coil RTB and releasing the rapid traverse brake so that the carrier can move toward the spindle at rapid traverse rate. The rapid traverse forward movement of the carrier continues until the operator releases push button 318 in wire 408, thus deenergizing contactor coil RTF and relay RTFR and the rapid traverse motor 181. The carrier feed is started by turning the hand feed switch knob 323 to the "On" position closing contact HF-3 in wire 409 and energizing relay 2FR in wire 413 since contacts FS-2 in wire 416, HUV-8 in wire 408 are now closed as are also contacts GLS1-B and HUV-6 in wire 385 while normally closed contacts RTRR-7 in wire 402, CDLS5-A and LCS-3 in wire 405 remain closed. The energization of relay 2FR opens contact 2FR-1 in wire 356 deenergizing coil RTB and releasing the rapid traverse brake and closing contact 2FR-2 in wire 359 to energize the coil of the feed clutch F2, thus causing the carrier to move forward at the No. 2 feed rate, it being recalled that the feed clutch F2 is on shaft 157, Fig. 7. The feed can be terminated by operation of limit switches CDLS1-A in wire 405, CDLS5-A in wire 405, or CDLS6-A in wire 401, as will be described in connection with the automatic operation of the machine or by the operator turning the hand feed switch knob 323 to "Off" position, thus opening contact HF-3 in wire 409 to effect deenergization of the relay 2FR to open contact 2FR-2 in wire 359 and deenergize clutch coil F2.

The operator can now cause the carrier to be retracted or returned at rapid traverse by depressing push button 319 on the panel 314, as previously described at the beginning of the description of the operation of the machine.

In order to index the carrier it must be returned or retracted to its fully out position so that limit switch CDLS4-B in wire 383 will be closed, as previously explained in connection with the hand undervoltage relay. The operator can then depress the hand "index" push button 320 in wire 383 to energize contactor coil IM in wire 386 and relay I in wire 383 since contact HUV-4 in wire 383 is already closed.

The energization of contactor IM closes contacts IM-1, IM-2, and IM-3 in wires 337, 338, and 339 to energize the index motor 228. The energization of relay I opens contacts I-1 in wire 357 of the D. C. control circuit to deenergize brake coil IB and closes contacts I-3 and I-4 in wire 386 to seal in the circuit the contactor coil IM and relay I through contacts CDLS4-B in wire 383 and GLS1-A in wire 386 and which latter had closed immediately upon the beginning of the indexing movement, since the high point of cam 222 had actuated its switch button, see Fig. 23.

The hand undervoltage relay HUV in wire 385 is held energized even though its sealing circuit through HUV-6 and GLS1-B in wire 385 is now opened, since contact CDLS4-B in wire 383 and contacts I-3 in wire 386 are now closed. After indexing has started push button 320 can be released since contactor coil IM in wire 386 and relay I in wire 383 are maintained energized through contacts I-3, I-4, GLS1-A in wire 386 and CDLS4-B in wire 383. When the next face of the carrier is reached in the indexing movement limit switch contacts GLS1-B in wire 385 again seals in the relay HUV in wire 385 and limit switch contacts GLS1-A in wire 386 open to deenergize contactor coil IM and relay I to deenergized the indexing motor and stop the indexing movement.

*Automatic operation*

When the machine is to be operated under automatic operation the main motor is started and the power and control circuits energized as previously described. The knob 325 of the machine control switch is turned to the "automatic" position whereupon undervoltage relay UV in wire 390 is energized through normally closed contacts HUV-7 in wire 390, HUV-5 and UV-6 in wire 384, now closed but normally open contact MC-3 in wire 390 and, if the carrier is completely indexed and is in its extreme rearward or out position, through limit switches GLS1-B in wire 385 and CDLS4-B in wire 383. In case the carrier is in partially indexed position or is not in its most rearward position, then the operator must first turn the knob 325 of the machine control switch to "hand" position and then to cause the carrier to completely index or to move to its most rearward position he depresses either the push button 320 of the hand index switch or the push button 318 of the rapid traverse return switch, or both of said push buttons, after which by returning the knob 325 from "hand" to "automatic" position he will effect the energization of the automatic undervoltage relay UV as previously described. The relay UV remains energized through contacts HUV-7 and MC-3 in wire 390, GLS1-B in wire 385 and UV-7 in wire 388.

The operator may now start the automatic cycle by depressing the push button 317 of the "cycle" start switch which is in wire 402. The closing of the "cycle" start switch energizes contactor coil RTF in wire 404 and relay RTFR in wire 406 through the normally closed contacts in wire 404 and the now closed but normally open contact UV-10 also in wire 404. The contactor coil RTF and the relay RTFR are sealed in the circuit through contact RTF-4 in wire 407 in parallel with the "cycle" start switch. The energization of contactor coil RTF and relay RTFR starts the carrier forward at a rapid rate, as described under hand operation. In addition, contact RTFR-2 between wires 370 and 371 energize solenoid operated valve SVC through limit switch FDLS and now closed contact UV-1 in wire 369 to release the spindle brake and start rotation of the spindle at speed No. 1, since neither solenoid operated valve SVA nor SVB is energized. The carrier will now be moving forward at rapid traverse, during which a dog on the control turret 68 selectively operates certain of limit switches TLS-1, TLS-2 and TLS-3, shown in Fig. 37, to select a desired spindle speed. As an illustrative example and assuming the desired speed is No. 2, the dog will first operate limit switch TLS-3 and then limit switch TLS-1, both shown in Fig. 37. This causes relay SR in wire 374 to be energized through normally closed contact RTRR and now closed but normally open contacts UV-2 and TLS1-B also in said wire.

The energization of relay SR closes normally open contact SR-4 in wire 378 to energize relay 2SR in wire 378 through limit switch TLS3-B and now closed contacts SR-4 and UV-4. Energized relay SR also opens contact SR-1 in wire 376 in the holding circuit for now open limit switch TLS2 shown in Fig. 37, and thus relay 1SR is deenergized if it had been previously energized. As the carrier movement continues the dog releases limit switch TLS1-B in wire 374, deenergizing relay SR to maintain relay 2SR energized through now closed UV-4, SR-3 and 2SR-2 in wires 378 and 379. At this time limit switch TLS3-B is reopened, but the energization of relay 2SR continues due to the holding circuit and effects closing of contact 2SR-1 in wire 373 to energize solenoid operated valve SVA to release hydraulic clutch C1 and engage clutch C2 and thus cause the spindle to rotate at speed No. 2.

At the point of carrier travel where its movement is changed from rapid traverse forward to feed, an overriding feed dog on control turret 68 operates either limit switch TLS4-B in wire 410, TLS5-B in wire 413, or TLS6-B in wire 414 to select feed rates 1, 2 or 3 as the case may be. It is assumed that the carrier is to feed at No. 3 rate and that there is no dwell or cross slide operation, therefore the overriding feed dog operates limit switch TLS6 shown in Fig. 37 to open the contact TLS6-A thereof to deenergize contactor coil RTF in wire 404 and relay RTFR in wire 406, thus insuring stoppage of the rapid traverse forward motion since the rapid traverse motor 181 is deenergized. The closing of limit switch TLS6-B by the overriding feed dog energizes relay 3FR in wire 414 through now closed contacts TLS6-B, UV-11 in wire 410, RTRR-7 in wire 402, CDLS5-A, CDLS1-A, LCS-3 in wire 405 and GLS1-B in wire 385 and UV-7 in wire 388.

The energization of relay 3FR in wire 414 insures deenergization of the other feed relays 1FR in wire 410 and 2FR in wire 413 since contacts 3FR-5 and 3FR-6 in wires 411 and 418, respectively, are opened, wherefore contact 3FR-4 in wire 404 opens thus preventing energization of contactor coil RTF in wire 404 and relay RTFR in wire 406 and assuring that the rapid traverse motor will not be energized during feed. The energization of relay 3FR in wire 414 causes said relay to be sealed in the circuit through now closed contact 3FR-7 and normally closed contacts 2FR-7 and 1FR-7 in wire 417 and now closed contact UV-12 in wire 411 and in parallel with limit switch TLS6-B and now closed contacts UV-11 in wire 410.

The energization of relay 3FR in wire 414 opened contact 3FR-1 in wire 356 of the D. C control circuit to deenergize the coil RB in wire 356 and release the rapid traverse brake. Also it closes contact 3FR-2 in wire 360 to energize coil of clutch F3 in wire 360 to advance the carrier at feed rate No. 3. Energization of relay 3FR in wire 414 also closed contacts 3FR-3 between wires 370 and 371 to maintain solenoid operated valve SVC in wire 369 energized and thus keep the spindle brake released.

At the end of the feed movement of the carrier the cam ring control drum 270 driven in timed relation to the feeding of the carrier has rotated so that the lug 271a on the wide ring 271 actuates limit switch CDLS1 shown in Fig. 25 to close the contacts CDLS1-B thereof in wire 397 to energize contactor coil RTR and relay RTRR in wires 392 and 393, respectively, since contacts CDLS4-A in wire 392 are normally closed while contacts UV-9 in wire 392, CDLS1-B, ILS6-A and LCS-1 in wire 397, GLS1-B in wire 385 and UV-7 in wire 388 are now closed. The energization of relay RTRR in wire 393 opens contact RTRR-7 in wire 402 to release feed relay 3FR in wire 414. The energization of relay RTRR in wire 393 also opens contact RTRR-8 in wire 404 to prevent energization of contactor coil RTF in wire 404 and relay RTFR in wire 406. In addition the energization of relay RTRR in wire 393 closes contact RTRR-2 between wires 370 and 371 to maintain solenoid operated valve SVC in wire 369 energized. The energization of contactor coil RTR in wire 392 and relay RTRR in wire 393 also causes the carrier to travel in reverse at rapid traverse as described in connection with the hand operation. Likewise the energization of relay RTRR in wire 393 closes contact RTRR-4 in wire 382 to energize relay IR in wire 381 through the now closed contact UV-5 and this conditions the index circuit by closing contact IR-2 in wire 387. The relay IR in wire 381 remains energized through now closed contact IR-1 and limit switch ILS5-A in wire 381. As the carrier reaches the extreme out or rearward position the lug 271d on the wide ring 271 of the drum 270 actuates limit switch CDLS-4 shown in Fig. 25 and the contacts CDLS4-A thereof in wire 392 are opened to deenergize contactor coil RTR in said wire and relay RTRR in wire 393 to cause deenergization of the rapid traverse motor 181 and hence stopping of the rearward rapid traverse movement of the carrier. When the contacts CDLS4-A of the limit switch in wire 392 were opened, the contacts CDLS4-B thereof in wire 383 were closed and this caused energization of the index contactor IM in wire 386 and of relay I in wire 383 through contacts CDLS4-B in wire 383, wire 384 and now closed contact IR-2 in wire 387. The indexing of the carrier proceeds as described in connection with the hand operation of the machine, it being understood that the contacts IR-2 and CDLS4-B replace the hand index push button actuated switch HI and the HUV-4 contacts.

Assuming that the next carrier face is not to be skip indexed, a dog on the index control drum 280 operates limit switch ILS5 shown in Fig. 37 before the next face of the carrier is reached and opens contacts ILS5-A thereof to deenergize relay IR in wire 381, with a resultant opening of contact IR-2 in wire 387, thus conditioning the circuit so that when limit switch GLS1-A in wire 386 is opened at the end of the indexing rotation contactor coil IM in said wire and relay I in wire 383 will be deenergized.

It will be understood that while the carrier is going from rapid traverse reverse to indexing movement and throughout the indexing movement the spindle brake solenoid operated valve SVC in wire 369 is maintained energized through closed contacts IR-3 and I-2 between the wires 370 and 371 because of the energization of relays IR in wire 381 and I in wire 383.

It will also be understood that while the carrier is going from rapid traverse reverse to indexing and throughout the indexing movement the contactor RTF in wire 404 and relay RTFR in wire 406 are maintained deenergized because normally closed contacts IR-4 and I-5 in wire 404 are now open due to the energization of relays IR and I respectively.

Upon the completion of the indexing movement, contactor coil RTF in wire 404 and relay RTFR in wire 406 are energized because of the now closed contacts lFR-4, 2FR-4, 3FR-4, RTRR-8, IR-4, I-5, UV-10, ILSI-A, TLS4-A, TLS5-A, TLS6-A all in wire 404 and RTRR-7 in wire 402, CDLS5-A, CDLS1-A, and LCS-3 in wire 405, GLSI-B in wire 385 and UV-7 in wire 388. The energization of contactor coil RTF in wire 404 and relay RTFR in wire 406 maintains the spindle brake released since contacts RTFR-2 between wires 370 and 371 are now closed and solenoid operated valve SVC in wire 369 is now energized. Also at this time the rapid traverse motor 181 is energized for forward operation since contacts RTF-1, RTF-2 and RTF-3 in the motor circuit are now closed. In addition normally closed contacts RTFR-1 in wire 356 are now open and hence brake coil RB in wire 356 of the rapid traverse brake is deenergized. Therefore the carrier now moves forward at rapid traverse rate for face No. 2.

The carrier now has been indexed to face No. 2 and if this is the face on which the work cycle is to end, a dog would be inserted on the index control drum 280 to open limit switch ILS1-A in wire 404 when said No. 2 face is reached. Under these circumstances the contactor coil RTF in wire 404 and relay RTFR in wire 406 would have remained deenergized until the "cycle" start push button 317 on the control panel 314 is depressed to close the "cycle" start switch in wire 402. When this button is depressed momentarily coil RTF and relay RTFR are energized and remain so due to the closing of contact RTF-4 in wire 407 which is in parallel with limit switch ILS1-A in wire 404 and with the "cycle" start switch in wire 402, wherefore another work cycle is initiated.

Assuming that it is desired to skip index a face of the carrier, the dog on the index control drum 280 that operates limit switch ILS5-A in wire 381 would be omitted, wherefore said switch remains closed and maintains relay IR in wire 381 energized since contact RTRR-4 in wire 382 would have been closed during the rapid traverse rearward movement. The continued energization of relay IR in wire 381 keeps relay I in wire 383 energized through now closed contact IR-2 in wire 387 and hence relay I will not be deenergized when normally closed limit switch GLS1-A in wire 386 is opened at the end of the normal indexing movement for one face therefore the indexing movement would continue for another face, after which it would terminate in the manner already described.

Assuming that it is desired to have a dwell period at the end of the carrier feed stroke and before initiation of the rapid traverse return movement, a dog is inserted on the index control drum 280 to operate limit switch ILS6-A in wire 397 on the face on which the dwell is desired. This causes opening of switch ILS6-A in wire 397 and hence interrupts the circuit to contactor coil RTR in wire 392 and relay RTRR in wire 393 and therefore delays the start of rapid traverse return until limit switch CDLS5-B in wire 395 is closed by lug 273a on the adjustable ring 273 of the cam ring control drum 270. Of course as soon as switch CDLS5-B in wire 395 is closed then the rapid traverse return movement starts as then contactor coil RTR in wire 392 and relay RTRR in wire 393 are energized and the same result produced as formerly described in connection with the closing of limit switch CDLS1-B in wire 397.

In order to operate the cross slides during movement of the carrier, that is "early" cross slide operation, a dog is inserted on the index control drum 280 to operate limit switch ILS3 or ILS4 shown in Fig. 37 or both for front or rear cross slide, respectively, or for simultaneous operation of both cross slides. Under these circumstances and during the forward travel of the carrier when the cross slide cam pin or pins 249 are opposite the inner concentric portion of the cam groove or grooves of the cross slide 237 then limit switch CDLS2-B in wire 398 closes to energize cross slide solenoid FCS in wire 398 or RCS in wire 400 or both through now closed contacts ILS3-B in wire 398 or ILS4-B in wire 400 and also through normally closed contact RTRR-6 and now closed contacts CELS2-B in wire 398 and LCS-1 in wire 397, now closed switch GLS1-B in wire 385 and now closed contact UV-7 in wire 388. The energization of the selected solenoid or solenoids inserts the cross slide pin or pins into the cam groove or grooves of the cross slide cam and said pin or pins are held in position mechanically during further operation of the cross slide, it being recalled that the rotation of the cross slide cam is in timed relation to the movement of the carrier and will now impart movement to the cross slides correlated to the movement of the carrier.

In order to operate the cross slides after the carrier has terminated its forward movement as, for instance, when the cross slides are used to operate a pusher tool on the carrier, that is, to operate the cross slides in "late" operation, dogs are inserted for the selected face of the carrier on the index control drum 280 to operate limit switches ILS2, and ILS3, or ILS4 shown in Fig. 37 for front or rear cross slide as selected. In this situation the feed selection dog on the control turret 68 that is to operate limit switch TLS4 or TLS5 or TLS6 shown in Fig. 37 for this face of the carrier must be set to operate in the extreme forward position of the carrier. The closing of limit switch ILS2-B in wire 391 energizes relay LCS in wire 391 at the end of the indexing movement of the carrier to the particular face thereof on which "late" cross slide operation is desired.

When the carrier in its forward movement passes over the point of operation for "early" cross slide movement, limit switch CDLS2 shown in Fig. 25, even though actuated by the lug 271b on the ring 271 on the cam ring control drum 270 to close contacts CDLS2-B in wire 398, will not energize the cross slide solenoids FCS in wire 398 and RCS in wire 400 since normally closed contacts LCS-1 in wire 397 have been opened by the energization of relay LCS in wire 391. Similarly, now open contacts LCS-1 in wire 397 prevent energization of contactor coil RTR in wire 392 and relay RTRR in wire 393 when limit switch CDLS1-B in wire 397 is actuated by lug 271a of the ring 271 or when limit switch CDLS5-B in wire 395 is actuated by lug 273a of ring 273 and therefore the return movement of the carrier is not initiated and the carrier remains in dwell in its forward position. Since normally closed contacts LCS-3 in wire 405 are now open the circuit to feed coils IFR in wire 410, 2FR in wire 413, and 3FR in wire 414 is interrupted. At this time normally open contacts LCS-4 in wire 401 are closed and coil RTF in wire 404 and relay RTFR in wire 406 remain energized. Therefore the operation of limit switches TLS4-A, TLS5-A or TLS6-A in wire 404 by the dog on the control turret 68 does not terminate the rapid traverse forward motion and does not start the feed motion at this time. When the carrier approaches the end of its forward travel just referred to, the cross slide cam will have the inner concentric portion of its groove or grooves opposite the cross slide pin or pins and limit switch CDLS3 shown in Fig. 25 is actuated or closed by the lug 271c of the ring 271 to energize the selected cross slide solenoid through contacts RTRR-6 in wire 398, CDLS3-B and LCS-2 in wire 401 to start the cross slide operation as previously described. The rapid traverse forward motion of the cross slide or slides terminates and feed motion thereof begins at the point where limit switch CDLS7 shown in Fig. 25 is actuated by the lug 274a on the adjustable ring 274. The opening of switch CDLS7-A in wire 402 deenergizes contactor coil RTF in wire 404 and relay RTFR in wire 406 since feed selection switch TLS4-A, TLS5-A or TLS6-A in wire 404 is now open. The closing of switch CDLS7-B in wire 402 energizes feed relay IFR in wire 410 or 2FR in wire 413 or 3FR in wire 414, as the case may be, since limit switch TLS4-B in wire 410, TLS5-B in wire 413 or TLS6-B in wire 414 is now closed. The forward movement of the cross slide or slides is terminated when the lug 272a on the adjustable ring 272 actuates limit switch CDLS6 shown in Fig. 25, it being recalled that said ring 272 is adjustable to provide for a dwell or not as desired. Opening switch CDLS6-A in wire 401 effects deenergization of contactor coil RTF in wire 404 and relay RTFR in wire 406 and also of the feed relay which had been previously energized. The closing of limit switch CDLS6-B in wire 396 energizes contactor coil RTR in wire 392 and relay RTRR in wire 393 to initiate the rapid traverse return movement of the carrier and cross slide or slides in the manner previously described.

It is believed that the foregoing explanation of the manner in which the machine and the control circuits operate will clearly indicate to one skilled in the art how the machine can be set up and operated in accordance with the particular type of work piece and the particular machining operations that are to be performed thereon. Therefore it should suffice to say that the dogs on the control turret 68, on the index control drum 280 and the cam rings 272, 273 and 274 will be adjusted or set in accordance with the particular machining operations to be performed in each of the operative steps of a work cycle when the machine is to function for automatic operation. It will also be understood that such dogs and rings may be utilized in the hand operation of the machine or the machine may be manually controlled entirely by manipulating the switch knobs and push buttons on the control panel.

Having thus described our invention, we claim:

1. In a machine tool having a support, a spindle rotatably carried by said support and adapted to mount a tool or workpiece, a longitudinally movable and rotatably indexible carrier mounted in said support and provided with a turret portion adapted to carry tools or workpieces, means for rotating said spindle and for moving and indexing said carrier, a control turret carried by said carrier and movable and indexible therewith, actuating elements positioned on said control turret, and control elements for said means actuated selectively during longitudinal movement of the carrier by said actuating elements.

2. In a machine tool having a support, a spindle rotatably carried by said support and adapted to mount a tool or workpiece, a longitudinally movable and rotatably indexible carrier mounted in said support and having its opposite ends extending outwardly of said support with one of said ends provided with a turret portion adapted to carry tools or workpieces, means for rotating said spindle and for moving and indexing said carrier, a control turret carried by the other end of said carrier and movable and indexible therewith, actuating elements positioned on said control turret, and control elements for said means actuated selectively during longitudinal movement of the carrier by said actuating elements.

3. In a machine tool as defined in claim 1 and wherein the means for rotating the spindle and for moving and indexing the carrier are electrical means which are controlled by switches actuated selectively during longitudinal movement of the carrier by the actuating elements on the control turret.

4. In a machine tool as defined in claim 1 and wherein said turret portion and said control turret have a plurality of faces with the faces of said control turret equalling in number the faces of the turret portion.

5. In a machine tool having a support, a spindle rotatably carried by said support and adapted to mount a tool or a workpiece, a longitudinally movable and rotatably indexible carrier mounted in said support and provided with a turret portion adapted to carry tools or workpieces, a slide movably mounted by said support, means for rotating said spindle and for moving said carrier and said slide, a control turret carried by said carrier and movable and indexible therewith, a control member movably carried by said support, means for moving said control member in timed relation to the movement of said carrier, actuating elements positioned on said control turret, actuating elements positioned on said control member, and control elements for said means, certain of said control elements being operatively associated with the actuating elements on said control turret to be actuated thereby during longitudinal movement of said carrier and other of said control elements being operatively associated with the actuating elements on said control member to be actuated thereby automatically in a predetermined manner during movement of said control member.

6. In a machine tool as defined in claim 5 and wherein the means for rotating the spindle and for moving the carrier and said slide is electrically driven means, while the control elements for said electrically driven means are banks of switches cooperating with and actuated by the actuating elements positioned on said control turret and on said control member.

7. In a machine tool having a support, a spindle rotatably carried by said support and adapted to mount a tool or a workpiece, a longitudinally movable and rotatably indexible carrier mounted in said support and provided with a turret portion adapted to carry tools or workpieces, a slide movably mounted by said support, means for rotating said spindle and for moving said carrier and said slide, a control turret carried by said carrier and movable and indexible therewith, a control member rotatably carried by said support, means for rotating said control member in timed relation to the longitudinal movement of said carrier, actuating elements positioned on said control turret, actuating elements positioned on said control member, and control elements for said means, certain of said control elements being operatively associated with the actuating elements on said control turret to be actuated thereby automatically during longitudinal movement of the carrier and other of said control elements being operatively associated with the actuating elements on said rotatable control member to be actuated thereby automatically in a predetermined manner during rotation of said control member.

8. In a machine tool having a support, a spindle rotatably carried by said support and adapted to mount a tool or a workpiece, a longitudinally movable and rotatably indexible carrier mounted in said support and provided with a turret portion adapted to carry tools or workpieces, cross slides movably mounted by said support, means for rotating said spindle and for moving said carrier, means for actuating said cross slides individually or simultaneously and operatively connected with said first named means to be operated in timed relation therewith, a control turret carried by said carrier and movable and indexible therewith, a control member movably carried by said support, means for moving said member in timed relation to the movement of said carrier, actuating elements positioned on said control turret, actuating elements positioned on said control member, control elements for said first means, certain of said control elements being operatively associated with the actuating elements on the control turret to be actuated thereby automatically during longitudinal movement of the carrier and other of said control elements being operatively associated with the actuating elements on said control member to be actuated thereby automatically in a predetermined manner during movement of said control member, and control elements for said cross slide actuating means, certain of said actuating elements on said control member being operatively associated with said last named control elements to effect selectively individual or simultaneous actuation of the cross slides.

9. In a machine tool having a support provided with an upwardly extending portion, a spindle rotatably carried by said portion and provided with a chuck adapted to mount a tool or workpiece, a longitudinally movable and rotatably indexible carrier mounted in said support portion above said spindle and provided with a free end having a turret portion overhanging said spindle and chuck and adapted to carry tools or workpieces and located adjacent the said chuck, means for rotating said spindle and for moving and indexing said carrier, a laterally extending portion on said support and located below said chuck and said free end of the carrier and said overhanging turret portion and provided with cross slide supporting means, cross slides on said supporting means, actuating mechanism for said cross slides located within said laterally extending portion of said support, and means operatively interconnecting said actuating mechanism with the means for moving said carrier.

10. In a machine tool as defined in claim 9 and wherein said actuating mechanism for the cross slides includes a movable member having a cam surface thereon, movement transmitting elements operatively connected with said cross slides, and means for operatively connecting and disconnecting said elements with or from said cam surface to effect actuation of said cross slides.

11. In a machine tool having a support provided with an upwardly extending portion, a spindle rotatably carried by said portion and provided with a chuck adapted to mount a tool or a workpiece, a longitudinally movable and rotatably indexible carrier mounted in said support portion and provided with a turret portion adapted to carry tools or workpieces and located adjacent the said chuck, means for rotating said spindle and for moving said carrier, a control turret carried by said carrier and movable and indexible therewith, a control member movably carried by said support, means for moving said control member in timed relation to the movement of said carrier, said support being provided with a laterally extending portion underlying said chuck and said turret portion and provided with cross slide supporting means, cross slides on said supporting means; actuating mechanism for said cross slides in said laterally extending support portion and including a movable member having a cam surface thereon and movement transmitting elements operatively connected with said cross slides, and connecting means for operatively connecting or disconnecting said elements with or from said cam surface, means operatively connecting said actuating mechanism with said means for rotating said spindle and for moving said carrier, actuating elements positioned on said control turret, control elements for said spindle rotating and carrier moving means and actuated by said actuating elements during longitudinal movement of the carrier, other actuating elements positioned on said control member, and control elements for said connecting means and actuated by said other actuating elements during longitudinal movement of the carrier to effect connection and disconnection of the movement transmitting elements with or from said cam surfaces.

12. In a machine tool as defined in claim 11 and wherein the means for rotating said spindle and for moving said carrier is electrically actuated, and the connecting means for operatively connecting or disconnecting the movement transmitting elements with or from said cam surface are electrically controlled, while said control elements are electrical switches.

13. In a machine tool having a support, a spindle rotatably carried by said support and adapted to mount a tool or workpiece, a longitudinally movable and rotatably indexible carrier mounted in said support and provided with a turret portion adapted to carry tools or workpieces, means for rotating said spindle and for moving and indexing said carrier, a control turret carried by said carrier and movable and indexible therewith, an indexible control drum mounted by said support, said control turret and said control drum having cooperating means interengageable at a predetermined point in the longitudinal movement of said carrier to interconnect said control turret and said control drum so said turret, drum and carrier can be indexed as a unit, and means for indexing said control drum when interconnected with said control turret.

14. A machine tool as defined in claim 13 and wherein actuating elements are positioned on said control turret and on said indexible control drum, while control elements are provided for the spindle rotating and carrier moving means and said indexing means, certain of said control elements being operatively associated with the actuating elements on said control turret and actuated thereby during longitudinal movement of the carrier and other of said control elements being operatively associated with the actuating elements on said indexible control drum and actuated thereby during indexing of said drum turret and carrier.

15. In a machine tool having a support, a spindle rotatably carried by said support and adapted to mount a tool or workpiece, a longitudinally movable and rotatably indexible carrier mounted in said support and provided with a turret portion adapted to carry tools or workpieces, means for rotating said spindle and for moving said carrier, a control turret carried by said carrier and movable and indexible therewith, an indexible control drum carried by said support, said control turret and said control drum having cooperating means which interengage in a predetermined point of the longitudinal movement of said carrier to interconnect said control turret and control drum so that said turret, drum and carrier can be indexed as a unit, means for indexing said control drum when interconnected with said control turret, and cooperating means on said support and said carrier and interengageable when said control turret and said control drum are disconnected and acting to maintain said carrier and control turret against indexing movement.

16. In a machine tool as defined in claim 15 and wherein the cooperating interengaging means on said support and carrier include a longitudinally extending groove on said support and circumferentially spaced projections on said carrier corresponding in number to the indexed positions of said carrier and interengaging sequentially in said groove.

17. In a machine tool having a support, a spindle rotatably carried by said support and adapted to mount a tool or a workpiece, a longitudinally movable and rotatably indexible carrier mounted in said support and provided with a turret portion adapted to carry tools or workpieces, a slide movably mounted by said support, means for rotating said spindle and for moving said carrier and said slide, a control turret carried by said carrier and movable and indexible therewith, a rotatable control member carried by said support, means for rotating said control member in timed relation to the longitudinal movement of said carrier, an indexible control drum mounted by said support, said control drum and said control turret having cooperating means interengaging in a predetermined position in the longitudinal movement of said carrier to interconnect said control drum with said control turret so said drum, turret, and carrier can be indexed as a unit, means for indexing said control drum when interconnected with said control turret and carrier, actuating elements positioned on said control turret, control member and control drum, and control elements for said spindle rotating and said carrier and slide moving means and for said indexing means, certain of said control elements being operatively associated with the actuating elements on said control turret and said rotatable control member and actuated thereby during longitudinal movement of said carrier and rotation of said member, other of said control elements being operatively associated with the actuating elements on said control drum and actuated thereby during indexing of the control drum, turret and carrier.

18. A machine tool as defined in claim 17 and wherein the means for rotating the spindle and for moving the carrier and slide and the means for indexing the indexible control drum, control turret and carrier are electrically driven means, while said control elements are switches for controlling the operation of said electrically driven means.

19. In a machine tool having a support, a movable part carried thereby and a change speed transmission mounted in said support for moving said part and including a shiftable element movable to different operative positions for imparting different rates of movement to said part, said support being provided with a portion having a bore therethrough and communicating with a counterbore at the outer side of said support, a shaft extending through said counterbore and said bore and beyond the outer and inner sides of said support, operative connections between the inner end of said shaft and said shiftable element, the outer end of said shaft being provided with a wrench receiving portion, a disk non-rotatable but slidable on said portion and provided with a plurality of circularly spaced keyways, a plate secured to said support at the outer end of said counterbore and having an opening through which said shaft extends and provided on its inner side with the key adapted to interlock with one of said keyways in each operative position of said shiftable element, and a spring in said counterbore and normally urging said disk in a direction to interlock said key with said keyways, wherefore when a wrench is applied to said portion of said shaft said disk will be moved inwardly against said spring to disengage said keyways to permit rocking of said shaft to shift said element to an operative position after which when the wrench is removed said spring moves said disk to interengage one of said keyways with said key.

20. In a machine tool having a support, a work spindle rotatable therein, a change speed transmission for rotating said work spindle at different speeds, said transmission including a power actuated drive shaft, a driven shaft operatively connected to said spindle, an intermediate shaft, two gear trains of different ratio between said drive shaft and said driven shaft and each including a gear keyed to said intermediate shaft, a pair of clutches on said drive shaft for selectively connecting one or the other of said gear trains thereto, a pair of friction clutches operatively associated with said driven shaft for operatively connecting said driven shaft with one or the other of said gear trains, and means for simultaneously disengaging said first pair of clutches and simultaneously engaging said friction clutches wherefore the action of said gear trains through said intermediate shaft produces a braking action on said driven shaft and said work spindle.

21. In a machine tool having a movable part, means for moving said part at different rates and including a drive shaft, a driven shaft, two gear trains between said shafts, a pair of hydraulically actuated clutches for selectively connecting said trains to said drive shaft, a pair of hydraulically actuated clutches for selectively connecting said trains to said driven shaft, and control means for said clutches including a valve block having therein three valve chambers; passages interconnecting said chambers with each other, with said clutches and with a hydraulic circuit; movable valve bodies in said chambers, and means for moving said valve bodies in a predetermined manner to selectively effect disengagement of all of said clutches, simultaneous engagement of one or the other of said first pair of clutches and one or the other of said second pair of clutches, or simultaneous disengagement of both of said first pair of clutches and simultaneous engagement of both of said second pair of clutches.

22. A machine tool as defined in claim 21 and wherein the means for actuating said valve bodies are solenoids, while electrical control means are provided for energizing said solenoids in a predetermined manner to effect the desired actuation of said valve bodies.

23. In a machine tool having a support, a spindle rotatably carried by said support and adapted to mount a tool or a work piece, a longitudinally movable and rotatably indexible carrier mounted in said support and provided with a turret portion adapted to carry tools or work pieces, a slide movably mounted by said support, means for rotating said spindle and for moving said carrier and said slide, a control turret carried by said carrier and movable and indexible therewith, actuating elements positioned on said control train, a control member rotatably carried by said support, means for rotating said control member in timed relation to the longitudinal movement of said carrier, actuating elements positioned on said control member, control elements for said means, certain of said control elements being operatively associated with the actuating elements on said control turret to be actuated thereby automatically during longitudinal movement of the carrier and other of said control elements being operatively associated with the actuating elements on said rotatable control member to be actuated thereby automatically in a predetermined manner during rotation of said control member, and means for adjusting certain of the actuating elements on said control member to vary the time at which said certain actuating elements actuate their respective cooperating control elements.

24. In a machine tool having a work spindle, means for rotating said work spindle, a slide, a feed turret including selectively operative electromagnetic clutches for imparting different feeding rates to said slide in timed relation to the rotation of the work spindle, a drive train for moving said slide and having an element operatively connected to said feed train, a rapid traverse motor operatively connected to said element with an unbroken driving connection therebetween, and an electrical control circuit for said motor and clutches including electrical interlock means deenergizing said clutches when the said motor is energized and deenergizing said motor when one of the clutches is energized.

25. A machine tool as defined in claim 24 and further comprising a longitudinally reciprocable and rotatably indexible carrier, and operative connections between said slide drive train and said carrier for imparting longitudinal movement to the latter from said drive train at either a feeding or rapid traverse rate.

26. In a machine tool as defined in claim 24 and further comprising means to prevent energization of any of said clutches after said motor has previously been energized until the speed of movement of said slide has been reduced to a feeding rate.

MYRON S. CURTIS.
HARRY SCHOEPE.

References Cited in the file of this patent

UNITED STATES PATENTS

| Number | Name | Date |
|---|---|---|
| 1,269,489 | Murphy | June 11, 1918 |
| 1,567,790 | Drissner | Dec. 29, 1925 |
| 1,692,315 | Simpson | Nov. 20, 1928 |
| 1,795,018 | Foster | Mar. 3, 1931 |
| 1,965,714 | Sinclair | July 10, 1934 |
| 1,987,006 | Foster | Jan. 8, 1935 |
| 2,086,851 | Bullard | July 13, 1937 |
| 2,237,183 | Jelinek et al. | Apr. 1, 1941 |
| 2,255,739 | Curtis | Sept. 9, 1941 |
| 2,302,353 | Smith | Nov. 17, 1942 |
| 2,317,264 | Eberhardt | Apr. 20, 1943 |
| 2,357,427 | Ruppel | Sept. 5, 1944 |
| 2,357,428 | Ruppel | Sept. 5, 1944 |
| 2,387,254 | Gigger | Oct. 23, 1945 |
| 2,455,876 | Potter et al. | Dec. 7, 1948 |

FOREIGN PATENTS

| Number | Country | Date |
|---|---|---|
| 228,026 | Switzerland | Oct. 16, 1943 |